United States Patent
Chai

(10) Patent No.: US 10,674,330 B2
(45) Date of Patent: Jun. 2, 2020

(54) CHARGING METHOD AND DEVICE

(71) Applicant: Huawei Technologies Co., Ltd., Shenzhen (CN)

(72) Inventor: Xiaoqian Chai, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/586,129

(22) Filed: Sep. 27, 2019

(65) Prior Publication Data
US 2020/0045514 A1 Feb. 6, 2020

Related U.S. Application Data

(63) Continuation of application No. PCT/CN2018/094481, filed on Jul. 4, 2018.

(30) Foreign Application Priority Data

Aug. 3, 2017 (CN) .......................... 2017 1 0657128

(51) Int. Cl.
*H04W 4/24* (2018.01)
*H04M 15/00* (2006.01)

(52) U.S. Cl.
CPC ............ *H04W 4/24* (2013.01); *H04M 15/64* (2013.01); *H04M 2215/32* (2013.01); *H04M 2215/7833* (2013.01)

(58) Field of Classification Search
CPC ...................................................... H04W 4/24
USPC ................................................ 455/405, 406
See application file for complete search history.

(56) References Cited

U.S. PATENT DOCUMENTS

| 9,531,554 B1 | 12/2016 | Velusamy et al. |
| 2013/0091281 A1 | 4/2013 | Chai et al. |
| 2013/0124675 A1* | 5/2013 | Mo .......................... G06F 9/461 709/217 |

(Continued)

FOREIGN PATENT DOCUMENTS

| CN | 101582777 A | 11/2009 |
| CN | 103797753 A | 5/2014 |
| CN | 106851856 A | 6/2017 |

(Continued)

OTHER PUBLICATIONS

3GPP TR 32.899 V0.2.0 (May 2017), 3rd Generation Partnership Project; Technical Specification Group Services and System Aspects; Telecommunication management; Charging management; Study on charging aspects of 5G system architecture Phase 1(Release 15), 40 pages.

*Primary Examiner* — Joel Ajayi
(74) *Attorney, Agent, or Firm* — Slater Matsil, LLP

(57) ABSTRACT

A charging method includes: determining, by a control plane function entity (CP), that a data flow that is transmitted by user equipment (UE) on a first data session needs to be migrated to a second data session; charging, by the CP, the data flow on the first UP through a first charging session between the CP and a charging system; obtaining, by the CP, charging information of the data flow before the migration that is counted by the first UP; and determining, by the CP, a quota that is used for the data flow after the migration is necessary to be delivered to the second UP, and delivering the quota to the second UP, thereby charging a service data flow of a user in a case of migration between user planes.

10 Claims, 11 Drawing Sheets

(56) References Cited

U.S. PATENT DOCUMENTS

2015/0319315 A1 11/2015 Chai
2016/0117658 A1 4/2016 Qing et al.

FOREIGN PATENT DOCUMENTS

EP 3001601 A1 3/2016
WO 2015161361 A1 10/2015

* cited by examiner

*1200*

*1300*

CHARGING METHOD AND DEVICE

CROSS-REFERENCE TO RELATED APPLICATIONS

This application is a continuation of International Patent Application No. PCT/CN2018/094481, filed on Jul. 4, 2018, which claims priority to Chinese Patent Application No. 201710657128.9, filed on Aug. 3, 2017. The disclosures of the aforementioned applications are hereby incorporated by reference in their entireties.

TECHNICAL FIELD

This application relates to the communications field, and in particular, to a charging method and apparatus.

BACKGROUND

Currently, a basic mechanism of online charging is as follows: A charging trigger function (CTF) applies to an online charging system (OCS) to reserve a quota of a rating group (Rating Group). The OCS grants the quota, and the CTF manages the quota, uses the quota, and collects charging information, and reports the collected charging information to the charging system when detecting that a charging reporting condition (a trigger condition) is met.

In a 4G network, a policy and charging enforcement function (PCEF) located at a gateway is a CTF, and the PCEF determines a charging mode (online charging or offline charging), a counting method (a volume, duration, or the like), a rating group (Rating Group, referred to as a charging key in this application), a reporting granularity, and the like according to a charging policy delivered by a policy and charging rules function (PCRF). A charging granularity includes SERVICE_IDENTIFIER_LEVEL or RATING_GROUP_LEVEL. If the charging granularity is RATING_GROUP_LEVEL, the PCEF needs to report charging information for each rating group. If the charging granularity is SERVICE_IDENTIFIER_LEVEL, the PCEF needs to report charging information for each rating group and each service identifier.

With a dramatic increase in a data volume, a new challenge is posed for a mobile network. To cope with the challenge, a mobile data network architecture in which a control plane and a user plane are separated is evolved. In this architecture, only control is performed on control planes, and the control planes may be deployed in a centralized manner; data flows pass through user planes, and the user planes are deployed in a distributed manner. A user may access a user plane nearby, to shorten a data transmission distance in a network, reduce a network delay, and improve network efficiency.

Currently, a network architecture in which a control plane and a user plane are separated has been extended in the 4G network, to implement, to some extent, charging in the network architecture in which the control plane and the user plane are separated. As shown in FIG. 1, a serving gateway-C, a PDN gateway-C, and a TDF-C are control planes, and a serving gateway-U, a PDN gateway-U, and a TDF-U are user planes. Generally, a control plane is a charging trigger point and performs a charging trigger function, and a user plane is a charging collection point and performs a charging collection function. In this architecture, a quantity of control planes and a quantity of user planes in a running state are in a ratio of 1:1.

However, with a dramatic increase in a mobile volume, a dramatic increase in a quantity of access devices, and enhanced requirements of a service on bandwidth, a delay, and the like, a relatively complex network architecture facing a future service requirement is evolved. For example, with movement of a user, pressure on a user plane, and a special requirement of a user service, user planes accessed by the user may be relatively frequently switched. Alternatively, a user may have a plurality of user planes at the same time, and a service data flow of the user is migrated between different user planes. A current charging mechanism cannot implement accurate charging processing in such a scenario.

SUMMARY

Embodiments of this application provide a charging method, mainly to resolve charging processing in a case of migration of a service data flow of a user between user planes when a user plane of a PDU session switches or when a PDU session has a plurality of user planes in an architecture in which network control and data flow forwarding are separated.

According to a first aspect, a charging method is provided. The method includes: determining, by a control plane function entity (CP), that a data flow that is transmitted by user equipment UE on a first data session needs to be migrated to a second data session, where the first data session is a data session between the UE and a first user plane function entity (UP), the second data session is a data session between the UE and a second UP, the first UP and the second UP are UPs corresponding to the CP, and the first data session and the second data session correspond to a same PDU session; obtaining, by the CP, charging information of the data flow before the migration that is counted by the first UP; and determining, by the CP, a quota used for the data flow after the migration is necessary to be delivered to the second UP, and delivering the quota to the second UP. According to this solution, the CP obtains charging information of a UP before a data flow is migrated and further determines a quota that needs to be delivered to a target UP after the migration and delivers the quota, thereby implementing continuity of charging processing during migration of a service data flow of a user between user planes.

Optionally, the CP charges the data flow on the first UP by using a first charging session between the CP and a charging system; the CP determines that no other data flow using a charging key that corresponds to the data flow exists on the first UP after the data flow is migrated from the first UP to the second UP; and the CP charges the data flow on the second UP by using the first charging session. According to this solution, the charging session may not change after switching.

Optionally, the obtaining, by the CP, charging information of the data flow before the migration that is counted by the first UP, and determining a quota that needs to be delivered to the second UP, and delivering the quota to the second UP includes: receiving, by the CP, charging information of the data flow before the migration that is reported by the first UP, reporting the charging information to the charging system, and requesting a quota for the data flow for the second UP; receiving, by the CP, a quota delivered by the charging system; and generating, by the CP based on the quota delivered by the charging system, the quota to be delivered to the second UP. According to this solution, the charging system senses occurrence of the migration and may perform more accurate quota control on charging upon UP switching.

Optionally, the obtaining, by the CP, charging information of the first UP, and determining a quota that needs to be delivered to the second UP includes: determining, by the CP, a remaining available quota based on the obtained charging information of the data flow before the migration that is counted by the first UP, and generating, based on the remaining available quota, the quota to be delivered to the second UP. According to this solution, the charging system does not need to sense switching between the UPs or the migration of the data flow, thereby relieving burden of the charging system.

Optionally, the method further includes: caching, by the CP, the charging information of the data flow before the migration that is reported by the first UP; receiving, by the CP, charging information of the data flow after the migration that is reported by the second UP; and merging, by the CP, the charging information reported by the second UP and the cached charging information reported by the first UP, and reporting merged charging information to the charging system.

Optionally, the method further includes: sending, by the CP to the second UP, the charging information of the data flow before the migration that is reported by the first UP, so that the second UP continually counts, based on the charging information of the data flow before the migration that is reported by the first UP, the charging information of the data flow after the migration; and receiving, by the CP, charging information of the data flow before and after the migration that is reported by the second UP when a reporting condition is met, and reporting the charging information reported by the second UP to the charging system.

Optionally, the CP determines, according to an indication delivered by the charging system, to report the charging information of the data flow before the migration to the charging system after the data flow on the PDU session is migrated from the first UP to the second UP. According to this solution, the charging system may set a charging reporting indication related to a data flow handover and deliver the charging reporting indication to the CP, to enhance charging flexibility.

Optionally, the obtaining, by the CP, charging information of the data flow before the migration that is counted by the first UP includes: receiving, by the CP, charging information that is reported by the first UP triggered by interruption of the first data session.

Optionally, the obtaining, by the CP, charging information of the data flow before the migration that is counted by the first UP includes: after detecting a data flow start event corresponding to the data flow that is reported by the second UP, obtaining, by the CP, the charging information of the data flow before the migration that is counted by the first UP.

Optionally, the method further includes: charging, by the CP, the data flow on the first UP through a first charging session between the CP and a charging system; determining, by the CP, that another data flow using a charging key that corresponds to the data flow exists on the first UP after the data flow is migrated from the first UP to the second UP; charging, by the CP, the data flow on the second UP by using the first charging session; and obtaining, by the CP, the charging information of the data flow from both the first UP and the second UP. The "another" data flow herein indicates a data flow that is not migrated to the second UP, relative to the data flow that is migrated to the second UP, and the another data flow is a data flow on the PDU session established by the CP. According to this solution, a data flow in an SSC mode 3 can be accurately charged, and it is ensured that a cross-CK data flow is not ignored due to the switching between the UPs.

Optionally, the CP further determines a quota that needs to be delivered to the first UP, and the method includes: dividing, by the CP, a quota that is delivered by the charging system for the charging key into a plurality of sub-quotas and separately delivering the plurality of sub-quotas to the first UP and the second UP.

Optionally, the method further includes: after a sub-quota on any UP is used up and charging information corresponding to the sub-quota is reported, obtaining, by the CP, charging information corresponding to sub-quotas that is counted by other UPs; and merging, by the CP, the charging information corresponding to the sub-quotas, and reporting the charging information to the charging system.

Optionally, the method further includes: after a sub-quota on any UP is used up and charging information corresponding to the sub-quota is reported, obtaining, by the CP, charging information corresponding to quotas that is counted by other UPs; and caching, by the CP, charging information corresponding to sub-quotas that is reported by all UPs, determining remaining available amounts of the quotas, re-allocating the remaining available amounts of the quotas, and delivering re-allocated quotas to the first UP and the second UP; and when the quotas are used up or the remaining available amounts of the quotas meet a reporting threshold, merging, by the CP, the cached charging information corresponding to the quotas, and reporting merged charging information to the charging system.

Optionally, the method further includes: charging, by the CP, the data flow on the first UP through a first charging session between the CP and a charging system; determining, by the CP, that another data flow using a charging key that corresponds to the data flow exists on the first UP after the data flow is migrated from the first UP to the second UP; and requesting the charging system for a quota for the second data session on which the data flow on the second UP is transmitted by using a second charging session, and delivering the applied quota to the second UP, where the second charging session is a charging session that is established between the CP and the charging system for the second data session on the second UP. According to this solution, a charging session for specially performing charging for a target UP is created, to implement efficient and accurate charging and relieve burden of the CP in quota processing.

According to a second aspect, a charging method is provided. The method includes: obtaining, by a control plane function entity (CP) from a first user plane function entity (UP) and a second UP, charging information of a data flow on a PDU session corresponding to the CP, where the first UP and the second UP are UPs corresponding to the CP; and dividing, by the CP, a quota that is delivered by a charging system into a plurality of sub-quotas and separately delivering the plurality of sub-quotas to the first UP and the second UP. According to this solution, the CP may simultaneously charge data flows generated on the two UPs corresponding to the CP.

Optionally, data flows using a same charging key exist on the first UP and the second UP; the CP obtains charging information of the data flows from both the first UP and the second UP; in a case of using a Diameter protocol interface, the CP charges the first UP and the second UP through a charging session between the CP and the charging system.

Optionally, the dividing, by the CP, a quota that is delivered by a charging system into a plurality of sub-quotas and delivering the plurality of sub-quotas to the UPs includes: dividing, by the CP, a quota that is delivered by the charging system for the charging key into a plurality of sub-quotas and separately delivering the plurality of sub-quotas to the first UP and the second UP.

Optionally, the method further includes: after a quota on any UP is used up and charging information corresponding to the quota is reported, obtaining, by the CP, charging information corresponding to quotas that is counted by other UPs; and merging, by the CP, the charging information corresponding to the quotas, and reporting the charging information to the charging system.

Optionally, the method further includes: after a quota on any UP is used up and charging information corresponding to the quota is reported, obtaining, by the CP, charging information corresponding to quotas that is counted by other UPs; and caching, by the CP, charging information corresponding to quotas that is reported by all UPs, determining remaining available amounts of the quotas, re-allocating the remaining available amounts of the quotas, and delivering re-allocated quotas to the first UP and the second UP; and when the quotas are used up or the remaining available amounts of the quotas meet a reporting threshold, merging, by the CP, the cached charging information corresponding to the quotas, and reporting merged charging information to the charging system.

According to a third aspect, a charging method is provided. The method includes the following steps: delivering, by an online charging system (OCS), indication information to a control plane function entity (CP), where the indication information indicates the CP, after a user plane function entity (UP) corresponding to the CP switches from a first UP to a second UP, to report charging information of the first UP before the switching to the OCS; and receiving, by the OCS, the charging information before the switching that is reported by the CP and that is counted by the first UP.

Optionally, the indication information is delivered with a quota delivered by the OCS to the CP.

Optionally, after receiving the charging information reported by the CP, the OCS delivers a quota for the second UP to the CP or delivers a quota for the first UP and a quota for the second UP to the CP.

According to a fourth aspect, a charging device is provided. The charging device includes a determining module, an obtaining module, and a processing module, where the determining module is configured to determine that a data flow that is transmitted by user equipment (UE) on a first data session needs to be migrated to a second data session, where the first data session is a data session between the UE and a first user plane function entity (UP), the second data session is a data session between the UE and a second UP, the first UP and the second UP are UPs corresponding to the charging device, and the first data session and the second data session correspond to a same PDU session; the obtaining module is configured to obtain charging information of the data flow before the migration that is counted by the first UP; and the processing module is configured to: determine a quota that is used for the data flow after the migration is necessary to be delivered to the second UP, and deliver the quota to the second UP.

Optionally, the charging device further includes a session module, configured to: establish a first charging session to a charging system and charge the data flow on the first UP through the first charging session, where the determining module is further configured to determine that no other data flow using a charging key that corresponds to the data flow exists on the first UP after the data flow is migrated from the first UP to the second UP, and the session module is further configured to charge the data flow on the second UP by using the first charging session.

Optionally, the obtaining module is configured to: receive charging information of the data flow before the migration that is reported by the first UP, report the charging information to the charging system by using the session module, and request a quota for the data flow for the second UP; the session module is configured to receive a quota delivered by the charging system; and the processing module is configured to generate, based on the quota delivered by the charging system, the quota to be delivered to the second UP.

Optionally, the processing module is configured to: determine a remaining available quota based on the obtained charging information of the data flow before the migration that is counted by the first UP, and generate, based on the remaining available quota, the quota to be delivered to the second UP.

Optionally, the obtaining module is configured to receive charging information that is reported by the first UP triggered by interruption of the first data session.

Optionally, the obtaining module is configured to: after a data flow start event corresponding to the data flow that is reported by the second UP is detected, obtain the charging information of the data flow before the migration that is counted by the first UP.

Optionally, the charging device further includes a session module, configured to: establish a first charging session to a charging system and charge the data flow on the first UP through the first charging session, where the determining module is configured to determine that another data flow using a charging key that corresponds to the data flow exists on the first UP after the data flow is migrated from the first UP to the second UP; and the obtaining module is further configured to obtain the charging information of the data flow from both the first UP and the second UP.

Optionally, the charging device further includes a session module, configured to: establish a first charging session to a charging system and charge the data flow on the first UP through the first charging session, where the determining module is further configured to determine that another data flow using a charging key that is corresponds to the data flow exists on the first UP after the data flow is migrated from the first UP to the second UP; the session module is further configured to: establish a second charging session with the charging system for the second data session on which the data flow on the second UP is transmitted and that is on the second UP, and request the charging system for a quota for the second UP by using the second charging session; and the processing module is further configured to deliver the applied quota to the second UP.

According to a fifth aspect, a charging system is provided. The charging system includes a delivery module and a receiving module. The delivery module is configured to deliver indication information to a control plane function entity (CP). The indication information indicates, after a user plane function entity (UP) corresponding to the CP switches from a first UP to a second UP, the CP to report charging information of the first UP before the switching to the OCS; and the receiving module is configured to receive the charging information before the switching that is reported by the CP and that is counted by the first UP.

According to a sixth aspect, a computing device is provided. The computing device may be a CP in an implementation and correspond to an SMF function entity in 5G, and includes a processor, a memory, a bus, and a communications interface, where the memory is configured to store a computing-device executable instruction, the processor is connected to the memory through the bus, and when the computing device operates, the processor executes the computing-device executable instruction stored in the memory, so that the computing device performs the charging method in either of the first aspect or the second aspect.

According to a seventh aspect, a computing device is provided. The computing device may be an OCS function entity in an implementation, and includes a processor, a memory, a bus, and a communications interface, where the memory is configured to store a computing-device executable instruction, the processor is connected to the memory through the bus, and when the computing device operates, the processor executes the computing-device executable instruction stored in the memory, so that the computing device performs the charging method in the third aspect.

According to an eighth aspect, an embodiment of this application provides a computer readable storage medium. The computer readable storage medium stores an instruction, and when the instruction runs on a computer, the computer is enabled to perform the charging method in any one of the first aspect, the second aspect, and the third aspect.

According to a ninth aspect, an embodiment of this application provides a computer program product including an instruction. When the instruction runs on a computer, the computer is enabled to perform the charging method in any one of the first aspect, the second aspect, and the third aspect.

For technical effects of any design manner in the second aspect to the ninth aspect, refer to descriptions of technical effects of different design manners in the first aspect or in the embodiments. Details are not described herein again.

According to a tenth aspect, a network system is provided. The network system includes the charging device in any one of the foregoing aspects and the charging system in any one of the foregoing aspects.

The foregoing aspects or other aspects of this application are clearer and easier to understand in the following descriptions of the embodiments.

In the solutions of the embodiments of the present invention, in a relatively complex scenario in which a control plane and a user plane are separated, for example, when a user plane of a PDU session switches or when a PDU session has a plurality of user planes, a service data flow of a user is charged in a case of migration between user planes, so that charging can support a lower end-to-end delay of a service, and network efficiency is improved by using optimal deployment, thereby accurately charging a data service in the optimal deployment and improving network efficiency and user experience.

DETAILED DESCRIPTION OF ILLUSTRATIVE EMBODIMENTS

Names of network elements in the embodiments of this application do not constitute a limitation to a device. Specifically, a name of a session management function does not constitute a limitation to the device. In practice, the session management function may have another name. For example, a name of a UP (User Plane) function does not constitute a limitation to the device. In practice, the user plane function may have another name, for example, a user plane function entity. A name of an online charging system does not constitute a limitation to the device. In practice, the online charging system may have another name, for example, a charging system or other names. Unified descriptions are provided herein, and details are not described below again.

A 5G network is used as an example in the solutions of the embodiments of this application, but an application scope is not limited to the 5G network. The solutions may also be applied to some 4G networks or a transition network from a 4G network to a 5G network, or may be applied to another possible future communications or charging system. Provided that there is a scenario in which a service data flow of a user is migrated between user planes when a user plane of a same PDU session (or a similar data connection) switches or when a PDU session has a plurality of user planes, solutions of related embodiments of the present invention may be used for a corresponding charging method.

Figure 1:
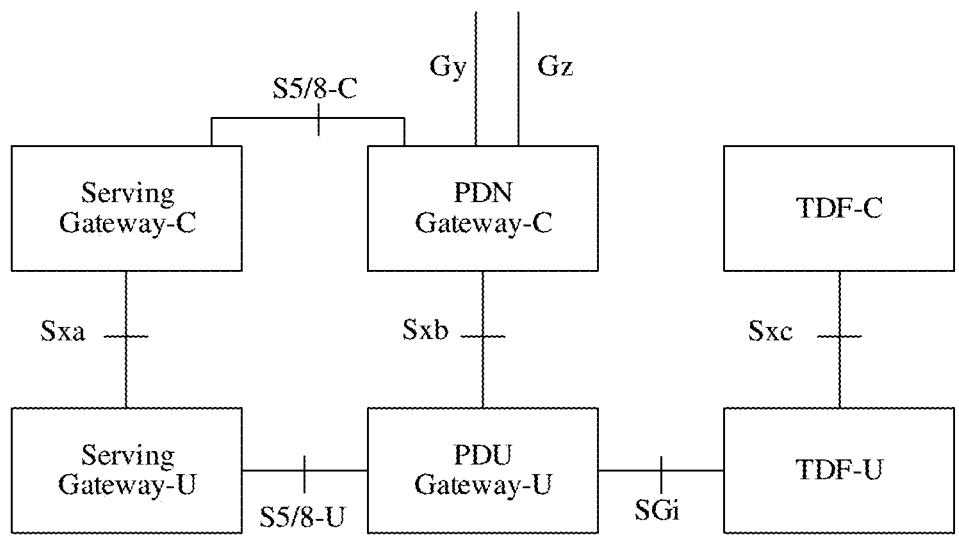
FIG. 1 is a schematic diagram of a network architecture in which a control plane and a user plane are separated.
Figure 2:
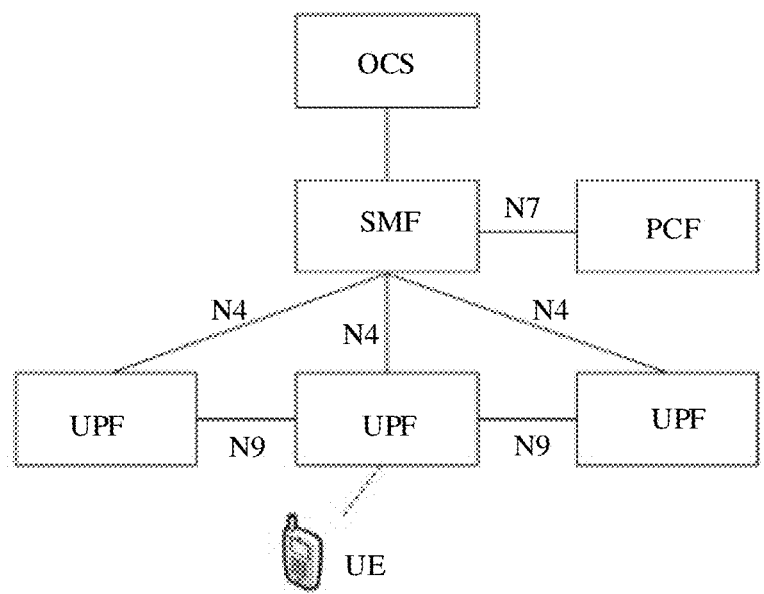
FIG. 2 is a schematic diagram of a network architecture according to an embodiment of this application.

FIG. 2 is a schematic diagram of a network architecture according to an embodiment of this application. An SMF is a session management function, a PCF is a policy control function, a UPF is a user plane function, an OCS is an online charging system, and UE is user equipment. The SMF communicates with the PCF through an N7 interface, the SMF communicates with the UPF through an N4 interface, and different UPFs communicate with each other through an N9 interface.

Functions of the SMF include: management, such as establishment, modification, and release, of a protocol data unit (PDU) session, internet protocol (IP) address assignment of the UE, UPF selection, UPF routing policy configuration, obtaining of a control policy of the PCF and execution of a control plane part of the control policy, and determining of a service and session continuity (SSC) mode (referred to as an SSC mode) of the PDU session under an IP type. Specifically, a PDU session has three SSC modes: an SSC mode 1, an SSC mode 2, and an SSC mode 3. SSC mode 1: In this mode, after a terminal establishes a PDU session, regardless of which area or which access technology the terminal moves to, a UPF network element of the PDU session is used as an anchor to serve the terminal. To be specific, the PDU session is not interrupted in any form due to movement of the terminal. SSC mode 2: In this mode, after a terminal establishes a PDU session, when the terminal moves, if the terminal leaves a serving area of a UPF network element, or due to reasons such as a fault or excessive load of the UPF network element, a network may re-select a UPF network element for the PDU session of the terminal and make the terminal establish a PDU session after the UPF network element is re-selected, and a service of a user is migrated from an original UPF to a new UPF. In this mode, the UPF network element may be considered to have a particular serving area. When the terminal moves in the serving area, the UPF network element serves the terminal. If the terminal leaves the serving area, a network may determine that the UPF network element cannot serve the terminal, an original PDU session established by using the UPF network element is interrupted, and a PDU session is established between the terminal and a new UPF. SSC mode 3: In this mode, after a terminal establishes a PDU session, a serving area of a UPF network element has a range. After the terminal leaves the serving area of the UPF network element, a network selects a new UPF network element for the terminal to serve the terminal, and the terminal establishes a PDU session by using the new UPF network element and an original DN network element. However, this mode differs from the SSC mode 2 in that a connection of a PDU session established by the terminal by using an old UPF network element may temporarily not be released but is released after the establishment of the new PDU session is completed.

Functions of the UPF include: completion of an anchor function of interaction with an external data network (a UPF having an anchor function is referred to as a UPF anchor), data packet routing and forwarding, data packet detection, and execution of a user plane part of a control policy activated by the PCF.

Functions of the PCF include generation and delivery of a policy, or activation of a policy statically configured on the SMF, and control, by using a policy, of QoS, gating, charging, and the like of a service data flow routed by a UPF. The SMF may determine, according to the policy delivered by the PCF, whether to establish an online charging session with the OCS and determine a charging key corresponding to the service data flow.

Functions of the OCS include performing quota granting according to a request of the SMF and performing balance deduction or returning based on quota usage information reported by the SMF.

The UE is a device having a subscriber permanent identity (SUPI) or an international mobile subscriber identity (IMSI), or may be a mobile phone having a SIM/eSIM, a tablet computer, a computer, an IoT device, or another device that may be connected to a 5G network or other networks.

In this application, a quota application, allocation, and charging information reporting interface may be a Diameter protocol interface or a service-based interface. The service-based interface is, for example, Restful. In a manner of using the service-based interface, a charging session is not established between a CP and a charging system, but the CP and the charging system interact with each other directly by using a service-based message. The service-based message (for example, Restful) is a stateless message.

In this application, the Diameter protocol is mainly used as an example for description. However, a message format is not limited in this application, and other formats such as a Restful API may be alternatively used.

Some concepts in this application are further described as follows.

Control plane: The control plane performs functions such as PDU session management, IP address assignment, and user plane selection. The control plane is referred to as a CP or a CP function entity in this application, and corresponds to an SMF in a 5G core network.

User plane: The user plane performs data packet routing and forwarding, data packet detection, and the like. The user plane is referred to as a UP or a UP function entity in this application, and corresponds to a UPF in a 5G core network.

PDU session: A PDU session (a PDU session is similar to an IP-CAN session in a 4G network or a 4G/5G transition network, and in subsequent descriptions, a PDU session is uniformly used to represent a related or similar concept) is established between the UE and a data network (DN) that provides a PDU connection service. A UPF is connected to the DN. Therefore, in other words, the PDU session is established between the UE and the UPF. Establishment of the PDU session is controlled by the SMF. Therefore, the UE sends a PDU session establishment request to the SMF, and the SMF selects a UPF that establishes a connection with the UE. A PDU session may have/correspond to a plurality of UPF entities.

Figure 3:
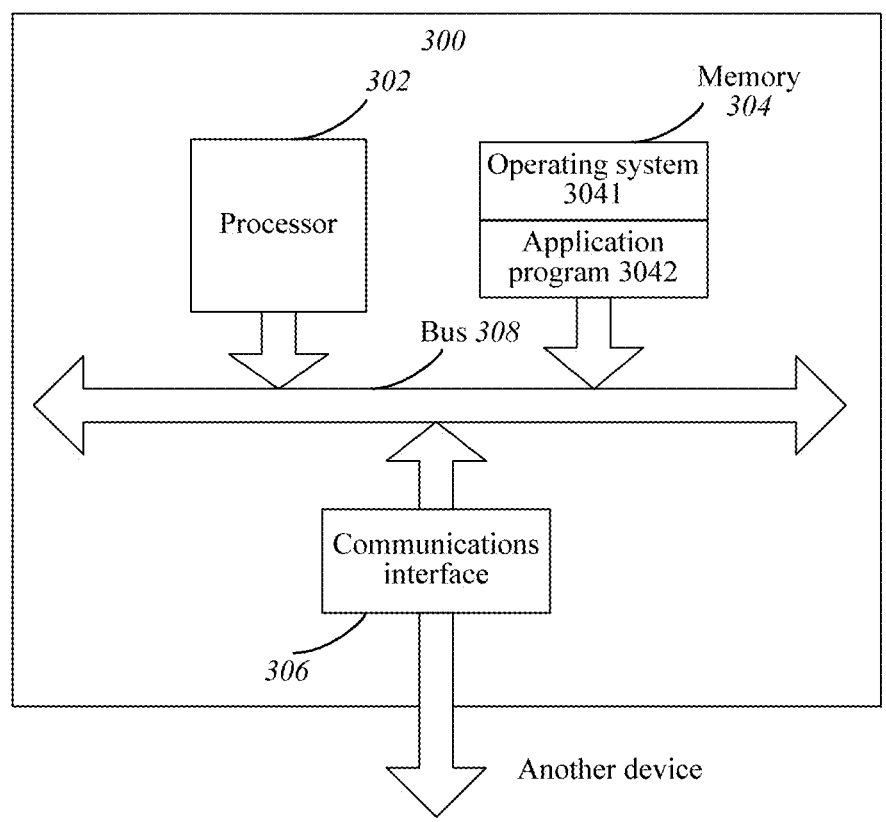
FIG. 3 is a schematic diagram of a hardware structure of a computer device 300 according to an embodiment of this application.

The CP, the OCS, and the UP may be implemented in a form of a computer device. FIG. 3 is a schematic diagram of a hardware structure of a computer device 300 according to an embodiment of this application. As shown in FIG. 3, the computer device 300 includes a processor 302, a memory 304, a communications interface 306, and a bus 308. The processor 302, the memory 304, and the communications interface 306 are in a communication connection to each other by using the bus 308.

The processor 302 may be a general-purpose central processing unit (CPU), a microprocessor, an application-specific integrated circuit (ASIC), or one or more integrated circuits, to execute a related program to implement the technical solutions provided in the embodiments of this application.

The memory 304 may be a read-only memory (ROM), a static storage device, a dynamic storage device, or a random access memory (RAM). The memory 304 may store an operating system 3041 and another application program 3042. When the technical solutions provided in the embodiments of this application are implemented by using software or firmware, program code used to implement the technical solutions provided in the embodiments of this application is stored in the memory 304, and is executed by the processor 302.

The communications interface 306 uses a transceiver apparatus, for example, but not limited to a transceiver, to implement communication with another device or a communications network.

The bus 308 may include a channel for transferring information between components (for example, the processor 302, the memory 304, and the communications interface 306).

When the computer device 300 is a CP, the processor 302 executes the program code that is used to implement the technical solutions provided in the embodiments of this application and that is stored in the memory 304, to implement methods shown in embodiments of FIG. 4 to FIG. 11.

When the computer device 300 is an OCS/OFCS, the processor 302 executes the program code that is used to implement the technical solutions provided in the embodiments of this application and that is stored in the memory 304, to implement methods shown in embodiments of FIG. 4 to FIG. 10.

In the embodiments of this application, a data service can be accurately charged in a case of migration of a service data flow of a user between user planes when a user plane of a PDU session switches or when a PDU session has a plurality of user planes, thereby improving network efficiency and user experience.

Figure 4:
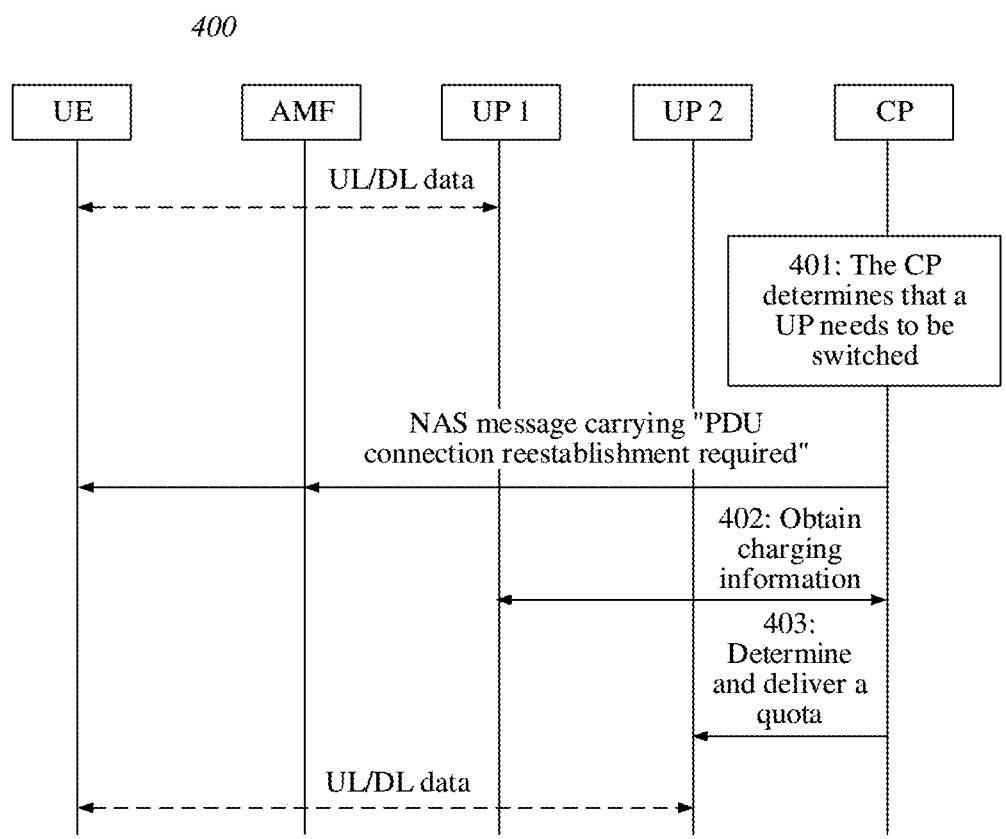
FIG. 4 is an illustrative flowchart of a charging method 400 according to an embodiment of this application.
Figure 5:
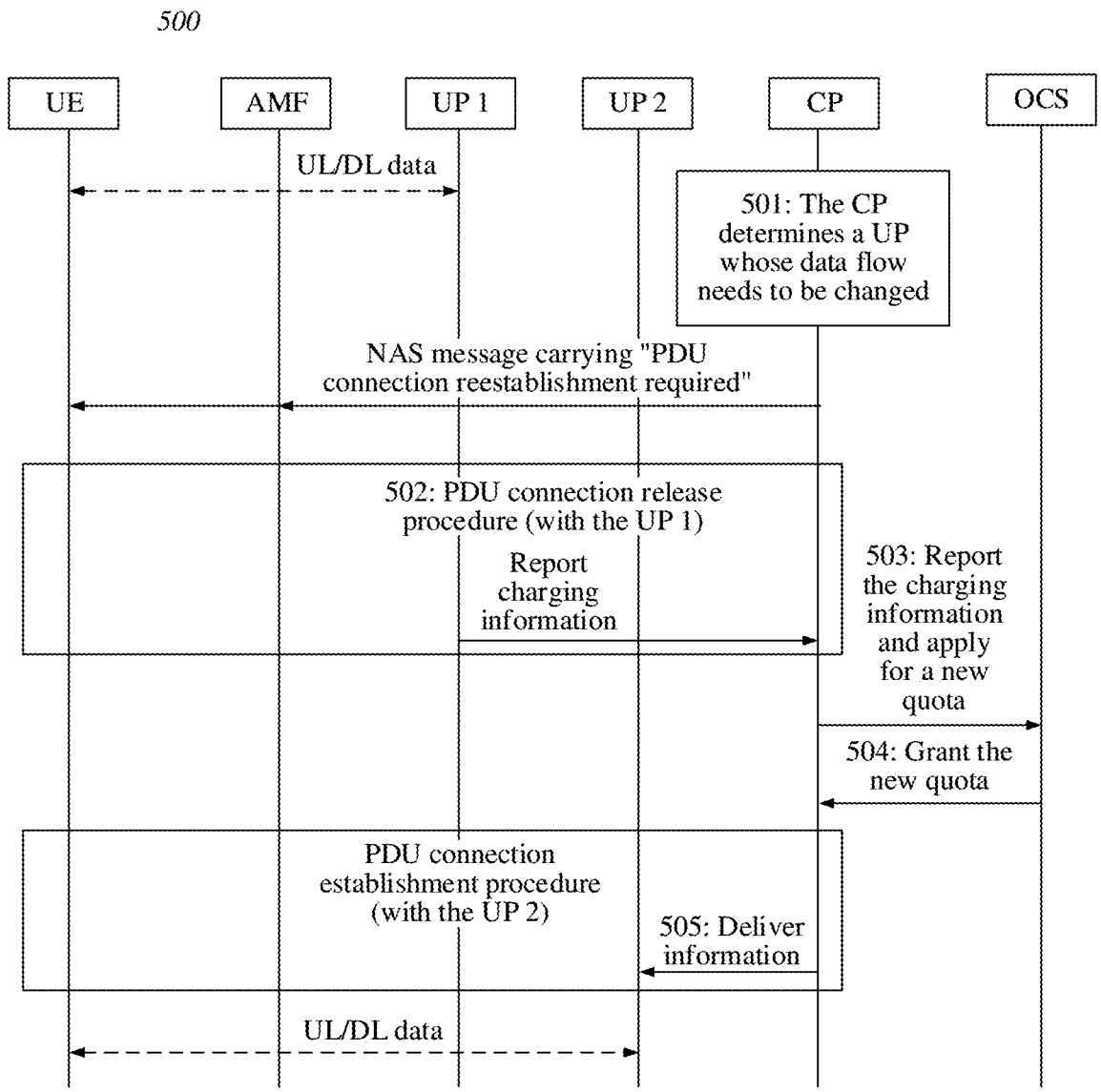
FIG. 5 is an illustrative flowchart of a charging method 500 according to an embodiment of this application.
Figure 6:
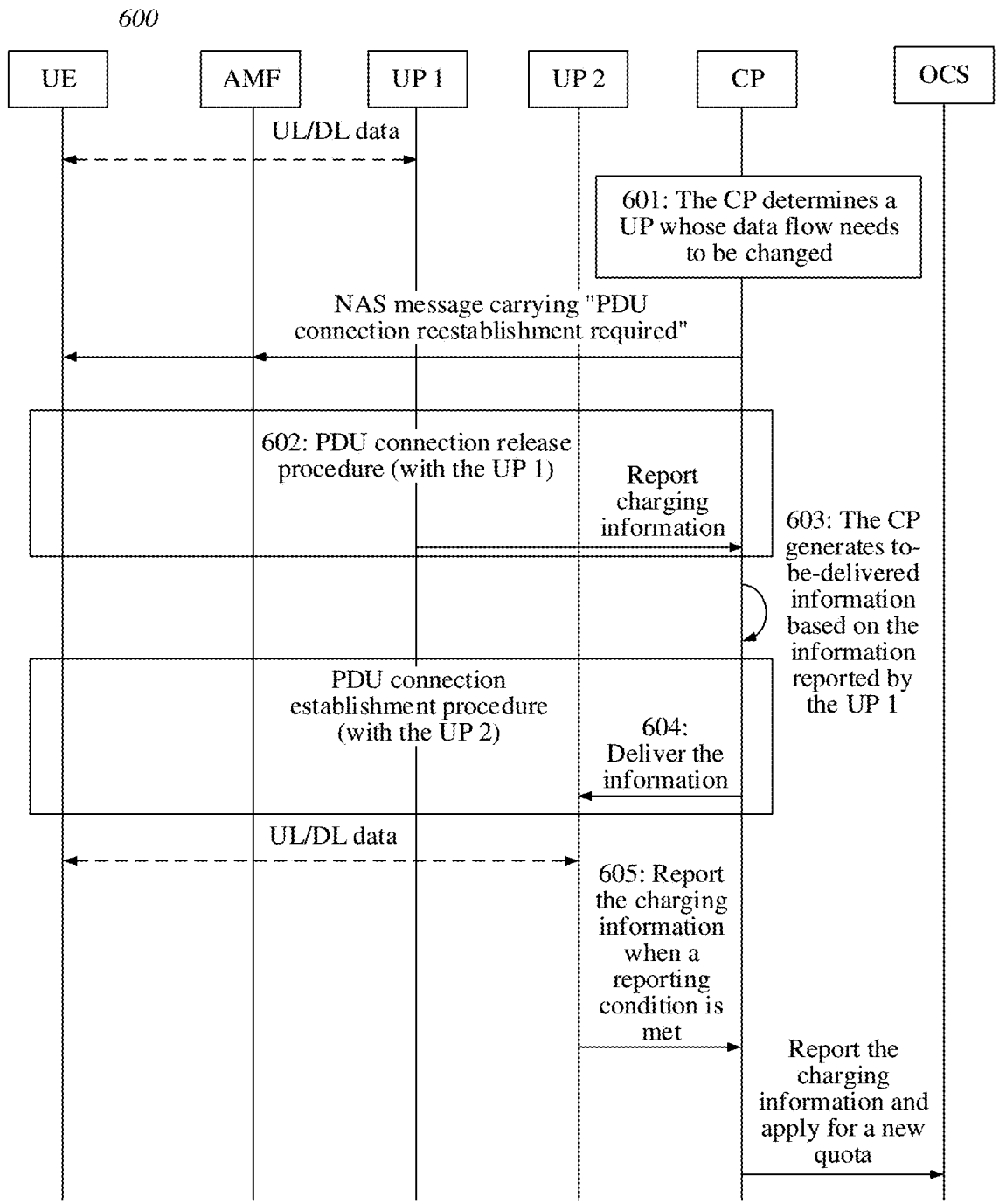
FIG. 6 is an illustrative flowchart of a charging method 600o according to an embodiment of this application.
Figure 7:
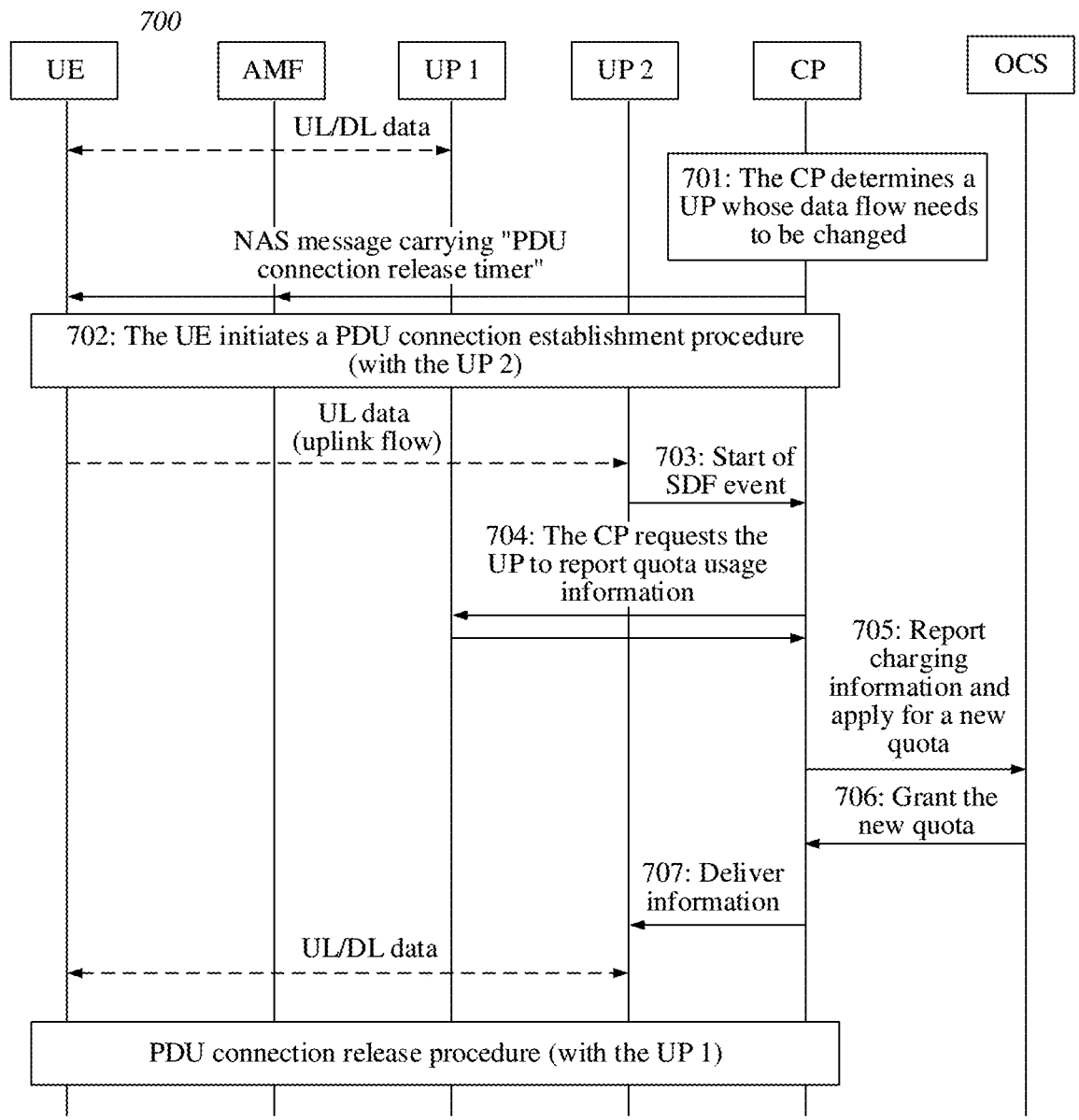
FIG. 7 is an illustrative flowchart of a charging method 700 according to an embodiment of this application.

FIG. 4 is an illustrative flowchart of a charging method 400 according to an embodiment of this application. The charging method 400 may be performed by the SMF (the CP), the OCS, or the UPF (the UP) shown in FIG. 2.

S401: The control plane function entity CP determines that a data flow that is transmitted by UE on a first data session needs to be migrated to a second data session, where the first data session is a data session that is established by the CP and that is between the UE and a first UP (a UP 1), the second data session is a data session between the UE and a second UP (a UP 2), the first UP and the second UP are UPs corresponding to the CP, and the first data session and the second data session correspond to a same PDU session; and the CP charges the data flow on the first UP by using a first charging session between the CP and a charging system.

Data flow transmission between the UE and a data network is implemented through an established PDU session. The PDU session is established between the UE and a data network (DN) that provides a PDU connection service. Establishment of the PDU session is controlled by the control plane function entity CP, for example, the SMF. Therefore, the UE sends a PDU session establishment request to the CP, and the CP selects a UP to establish a connection to the UE. There is a case in which a service data flow of a user is migrated between user planes when a user plane of a PDU session switches or when a PDU session has a plurality of user planes. A PDU session between the UE and the user plane is migrated to a different user plane or established on two or more user planes at the same time. However, in a migration process, two or more UPs correspond to the same CP, and the PDU session remains unchanged. The "remaining unchanged" or the "same" PDU session herein means that for the PDU session, the control plane basically remains unchanged in a change process of the UPs. Specifically, a session ID, and an IP address and an access point (DNN) of the UE remain unchanged.

S402: The CP obtains charging information of the data flow before the migration that is counted by the first UP.

Because switching between user planes is involved, when the service data flow is migrated to the second UP, a charging collection point also changes. This change includes, but is not limited to: The charging collection point is migrated from the first UP to the second UP, and the second UP is used as a unique charging collection point after the migration; or both the first UP and the second UP are used as charging collection points after the migration. The CP obtains the charging information on the first UP before completing the migration (including the charging information on the first UP in the migration process). If a data connection between the UE and the first UP still exists after the migration, the CP may continually obtain the charging information of the first UP for quota management during or after the migration, thereby ensuring continuity and accuracy of a charging process.

A specific manner of obtaining the charging information may be as follows: The first UP actively reports the charging information, or the CP sends an obtaining request to the first UP to obtain the charging information. There may be a plurality of implementations for a trigger manner. For example, occurrence of migration (migration decision or actual migration occurrence, for example, a session of the first UP is released) triggers the first UP to actively report the charging information, or the CP may request the first UP to report the charging information after detecting that the second UP starts to transmit the service data flow. Specifically, the charging information may be obtained by configuring a related trigger condition (trigger) on the CP or the UP.

S403: The CP determines a quota that is used for the data flow after the migration is necessary to be delivered to the second UP, and delivers the quota to the second UP.

In an online charging case, the CP needs to determine the quota to be delivered to the second UP, to ensure that a volume generated on the second UP can be counted and charged.

Specifically, depending on whether the OCS senses the migration, the CP may autonomously determine the quota to be delivered to the second UP (the OCS does not sense the migration between UPs) or request the OCS for a new quota (the OCS senses the migration between UPs, and the quota needs to be re-delivered because of the migration).

According to the technical solution provided in this embodiment of this application, after deciding to perform migration between UPs, the CP obtains charging information of a UP before migration, and further determines a quota that needs to be delivered to a target UP after the migration and delivers the quota, to implement charging upon migration between user planes in a CU separation scenario in which one control plane corresponds to a plurality of user planes, thereby ensuring continuity and accuracy of charging.

A charging processing process in a case in which a UP carrying the data flow is change is described below with reference to more specific implementations. In this embodiment of the present invention, the data flow is a data flow of a PDU session. In a migration process, the PDU session remains unchanged, the first UP (the UP 1) is a UP before the migration, and the second UP (the UP 2) is a UP after the migration. That the UP carrying the data flow changes includes one of the following cases:

Case A: The CP first removes a connection between the UE and the UP 1 and then establishes a connection between the UE and the UP 2. In other words, one PDU session corresponds to only one UP. A case of the SSC mode 2 belongs to the case A.

Case B: The CP establishes a connection between the UE and the UP 2 but does not remove a connection between the UE and the UP 1. In other words, one PDU session corresponds to a plurality of UPs at the same time. The CP may remove the connection between the UE and the UP 1 after all service data flows are migrated to the UP 2 (all data flows of the PDU session are migrated); or the connection between the UE and the UP 1 is not removed but the connection of the UP 2 is used to carry a part of a service volume (some data flows of the PDU session are migrated). A case of the SSC mode 3 belongs to the case B.

In the foregoing two cases A and B, the CP, used as the CTF, interacts with the charging system and establishes a charging session for a PDU session, and the UP reports collected charging information to the CP.

In the case A, the CP terminates a PDU session between the UE and the UP 1 and then establishes a PDU session between the UE and the UP 2. In this case, the UP of the data flow is changed. A charging processing method in the case A is described in detail below depending on whether the OCS senses the migration of the data flow between the UPs:

A1: For a charging processing method provided when the OCS senses migration of a data flow between the UPs, refer to FIG. 5.

Step 501: The CP determines a UP whose data flow needs to be changed, and the CP terminates a PDU session between the UE and the UP 1 and establishes a PDU session between the UE and the UP 2 (a UP collecting charging information changes).

Step 502: The CP initiates to terminate the PDU session on the UP 1 and receives charging information reported by the UP 1. Specifically, the CP initiates to release the PDU session on the UP 1 and establishes the PDU session on the UP 2. A PDU session release procedure on the UP 1 triggers the UP 1 to report the charging information to the CP.

The reported information of the UP 1 includes a reporting reason (that is, a trigger condition for triggering the reporting). The reporting reason herein is PDU Session Release. Example of a format of the reported information:

---
ID corresponding to a quota
Reporting reason (Reporting Trigger)
Charging information (Measurement information)

---

Step 503: The CP generates, based on the charging information reported by the UP 1, charging information to be reported to the OCS; reports the charging information to the OCS and requests a new quota for the data flow on the second UP, where a reporting reason indicates that the UP changes.

The reported information carries UP 1's information (for example, an IP address).

Example of a reporting format: a Diameter format
Used-Service-Unit
Reporting-Reason (indicating a reporting reason: UP changed)
Tariff-Time-Change
CC-Time
CC-Total-Octets
CC-Input-Octets
CC-Output-Octets
"Rating-Group": 1

If the reporting format is a Restful format, a message example is as follows:
POST https://{serverRoot}/charging/serviceunits
Content-type: application/json
{
"id": 12358,
"usedunits": {
  "reason": "UP changed",
  "units": 256728,
  "uplinkunits": 226326,
  "downlinkunits":30402,
},
"ratinggroup": 1

Step 504: The OCS delivers, to the CP, a new granted quota for the data flow on the second UP.

Step 505: The CP generates, based on the new quota, information to be delivered to the UP 2, where the information carries corresponding information of the new quota; and delivers the generated information to the UP 2, so that the UP 2 uses the new quota for a subsequent data flow.

When establishing the PDU session on the UP 2, or before completing establishment of the PDU session on the UP 2 and transmitting the data flow, the CP delivers, to the UP 2, information that is generated based on the new quota granted by the OCS.

The delivered information includes a data flow detection rule and threshold information corresponding to the new quota, and association information of the data flow detection rule and the threshold information.

In the solution of this embodiment of the present invention, in an architecture in which network control and data flow forwarding are separated, charging processing is implemented when a user plane of a PDU session switches. After the PDU session between the UE and the UP 1 is released, the UP 1 is triggered to report the charging information to the CP, the CP further reports the charging information of the UP 1 to the OCS and requests the new quota for the UP2. The reporting reason indicates that the UP changes, thereby implementing charging processing when the OCS can sense the migration of the data flow between the UPs. Because the OCS senses the migration of the data flow between the UPs, the OCS may use and execute different charge rates for service data flows on different UPs to support more flexible and proper charging and relieve burden for the CP to participate in quota management.

A2: A charging processing method is provided when the OCS does not sense migration of a data flow between the UPs, refer to FIG. 6. Specific steps are described as follows:

Step 601: The CP determines a UP whose data flow needs to be changed (a UP collecting charging information changes), and the CP terminates a PDU session between the UE and the UP 1 and establishes a PDU session between the UE and the UP 2.

Step 602: The CP initiates to terminate the PDU session on the UP 1 and receives charging information reported by the UP 1.

Specifically, the CP initiates to release the PDU session on the UP 1 and establishes the PDU session on the UP 2. A PDU session release procedure on the UP 1 may trigger the UP 1 to report the charging information to the CP.

The reported information of the UP 1 includes a reporting reason (that is, a condition for triggering the reporting). The reporting reason herein is PDU Session Release.

Step 603: The CP determines a remaining available quota based on the charging information of the data flow that is reported by the UP 1, and generates, based on the remaining available quota, information to be delivered to the UP 2. The information carries information of the remaining available quota.

A method for determining, by the CP, the remaining available quota based on the charging information reported by the UP 1 is one of the following:

If the CP caches quota information when delivering the quota to the UP 1, the UP 1 may report only usage information of the quota, and the CP deducts the usage information of the quota reported by the UP 1 from the cached quota information, to obtain the remaining available quota.

Example of a Format of the Reported Information

---
ID corresponding to a quota
Reporting reason (Reporting Trigger)
Charging information: {Usage information}

---

If the CP does not cache the quota information when delivering the quota to the UP 1, the UP 1 reports both the usage information of the quota and a remaining quota value, and the CP uses the received remaining quota value reported by the UP 1 as the remaining available quota.

Example of a Format of the Reported Information

---
ID corresponding to a quota
Reporting reason (Reporting Trigger)
Charging information: {Usage information, remainder quota}

---

After obtaining the remaining available quota, the CP further determines whether a condition for reporting to the OCS is met, and the determining is performed based on a trigger condition delivered by the OCS. For example, if the remaining quota is just lower than a threshold specified by the OCS, the condition of reporting to the OCS is met. If the condition is met, information to be reported to the OCS is generated based on the reporting performed by the UP 1, and the CP normally reports the information to the OCS, and requests a new quota. A reporting reason indicates the met trigger condition. If the condition of reporting to the OCS is not met, information to be delivered to the UP 2 is generated based on the remaining available quota. The information carries information of the remaining available quota.

Step 604: The CP delivers the information carrying the remaining available quota to the UP 2, so that the UP 2 uses the remaining available quota for a subsequent data flow.

When establishing the PDU session on the UP 2, or before completing establishment of the PDU session on the UP 2 and transmitting the data flow, the CP delivers, to the UP 2, the information generated based on the remaining available quota.

The CP processes, by using any of the following methods, the charging information reported by the UP 1:

a. The CP caches the usage information reported by the UP 1.

b. The CP delivers the information reported by the UP 1 to the UP 2, and the UP 2 continually counts based on the reported information.

Step 605: The CP receives usage information that is reported by the UP 2 when a reporting condition is met, generates, based on the usage information reported by the UP 1 and the usage information reported by the UP 2, information to be reported to the OCS, and reports the generated information to the OCS.

Specifically, if the CP caches the charging information reported by the UP 1, the CP merges the usage information reported by the UP 2 and the cached usage information reported by the UP 1 to generate the charging information to be reported to the OCS, and reports the generated charging information to the OCS. If the CP previously also delivers the information reported by the UP 1 to the UP 2, the UP 2 continues to perform accumulation based on the usage information reported by the UP 1 and performs merging and reporting. The CP generates, based on the charging information reported by the UP 2, the charging information to be reported to the OCS, and reports the generated charging information to the OCS.

In the solution of this embodiment of the present invention, in an architecture in which network control and data flow forwarding are separated, charging processing when a user plane of a PDU session switches is implemented. After the PDU session between the UE and the UP 1 is released, the UP 1 is triggered to report the charging information to the CP, the CP autonomously processes, based on the charging information reported by the UP 1, use of a remaining quota after the data flow is migrated. The OCS does not sense the migration between UPs, so that when the OCS does not need to perform charging processing based on the UP, a quantity of signaling reported to the OCS is reduced, and burden of the OCS is relieved.

A3: The CP may determine, as indicated by the OCS, to use a related charging method in the foregoing embodiment of A1 or A2. Specifically, the OCS may deliver, based on a decision of the OCS or an operator configuration, a trigger condition (Trigger) indicating a change of the UP alone or together with the quota when the quota is delivered to the CP. The trigger condition indicates the CP to initiate re-authorization to the OCS when the UP using the quota changes. Specific steps are described as follows:

Step 1: The CP determines a UP whose data flow needs to be changed (a UP performing charging changes), and the CP first terminates a PDU session between the UE and the UP 1 and establishes a PDU session between the UE and the UP 2.

Step 2: The CP initiates to terminate the PDU session on the UP 1 and receives charging information reported by the UP 1. A PDU session release procedure on the UP 1 triggers the UP 1 to report the charging information to the CP. The reported information of the UP 1 includes a reporting reason (that is, a condition for triggering the reporting). The reporting reason herein is PDU Session Release.

Step 3: If the OCS delivers, for the quota, a trigger condition indicating a change of the UP, the reporting performed by the UP 1 makes the trigger condition be met, so that the CP performs steps 503 to 505 of A1; or if the OCS does not deliver, for the quota, a trigger condition indicating a change of the UP, the CP performs steps 603 to 605 of A2.

The OCS delivers the quota to the CP. The OCS delivers, based on a decision of the OCS or an operator configuration, the trigger condition indicating the change of the UP together with the quota. Therefore, charging flexibility can be enhanced and autonomy of the OCS can be improved. When different charge rates need to be used and executed for service data flows on the different UPs to support more flexible and proper charging, the OCS indicates the CP to report the migration of the data flow between the UPs. When the OCS does not need to perform charging processing based on the UPs, The OCS indicate the CP not to report the migration of the data flow between the UPs, to reduce signaling.

The case B is described below: The CP establishes a PDU session between the UE and the UP 2 but does not remove a connection between the UE and the UP 1. In other words, one PDU session corresponds to a plurality of UPs at the same time. In this case, the UP of the data flow changes, and processing is performed in two cases:

B1: After the PDU session between the UE and the UP 2 is established, if a service data flow on the UP 1 is migrated to the UP 2, and the service data flow on the UP1 uses a charging key (CK) as a granularity. A case in which all data flows on the UP 1 are migrated to the UP 2 is included, as shown in an example in Table 1.

TABLE 1

| Before the migration | | | After the migration | | | |
|---|---|---|---|---|---|---|
| UP 1 | | | UP 1 | UP 2 | | |
| CK 1 | CK 2 | | | CK 1 | CK 2 | |
| SF 1 | SF 2 | SF 3 | | SF 1 | SF 2 | SF 3 |

In addition, a case in which data flows corresponding to a charging key (for example, a CK 2) on the UP 1 are migrated to the UP 2 is included, as shown in an example in Table 2.

TABLE 2

| Before the migration | | | After the migration | | |
|---|---|---|---|---|---|
| UP 1 | | | UP 1 | UP 2 | |
| CK 1 | CK 2 | | CK 1 | CK 2 | |
| SF 1 | SF 2 | SF 3 | SF 1 | SF 2 | SF 3 |

The CP may determine, during or after the migration, whether a data flow corresponding to a charging key crosses the UPs; or may consider, when delivering a routing table, whether a data flow corresponding to a charging key crosses the UPs. To be specific, control, by using the routing table when a routing policy is generated, whether the data flow corresponding to the charging key crosses the UPs. A specific method may be as follows: The CP determines, based on routing tables generated by the CP for the UP 1 and the UP 2 and a flow template corresponding to a charging key delivered by the PCF, whether content covered by the flow template corresponding to the charging key is distributed to the routing tables of the UP 1 and the UP 2, to determine whether a data flow corresponding to the charging key crosses the UPs.

In this embodiment, when the CP determines that the service data flow crosses the UPs by using the CK as a granularity, a specific charging method is as follows:

B11: For a charging processing method provided when the OCS senses migration of a data flow between the UPs, refer to FIG. 7.

Step 701: The CP determines a UP whose data flow needs to be changed (a UP performing charging changes).

Step 702: The CP initiates to establish a PDU session on the UP 2.

Step 703: After the establishment of the PDU session on the UP 2 succeeds, the SMF notifies the UE, and the UE initiates to migrate, an uplink data flow sent by the UE to the PDU session on the UP 2. When receiving the uplink flow, the UP 2 triggers a Start of SDF (start of the service data flow) event and reports the event to the CP.

Step 704: After receiving the Start of SDF event reported by the UP 2, the CP sends, to the UP 1, a message for requesting to report charging information, and receives the charging information reported by the UP 1.

The reported information of the UP 1 includes a reporting reason (that is, a condition for triggering the reporting). The reporting reason herein is PDU Session Release.

Example of a Format of the Reported Information

ID corresponding to a quota
Reporting reason (Reporting Trigger)
Charging information (Measurement information)

Step 705: The CP generates, based on the charging information reported by the UP 1, charging information to be reported to the OCS; reports the charging information to the OCS, where the reporting reason indicates that the UP changes; and applies for a new quota.

The reported information carries UP 1 information (for example, an IP address).

Example of a reporting format:
Used-Service-Unit
Reporting-Reason (indicating a reporting reason: UP changed)
Tariff-Time-Change
CC-Time
CC-Total-Octets
CC-Input-Octets
CC-Output-Octets
Rating-Group Step 706: The OCS delivers the new quota to the CP.

Step 707: The CP generates, based on the new quota, information to be delivered to the UP 2, where the information carries corresponding information of the new quota; and delivers the generated information to the UP 2, so that the UP 2 uses the new quota for a subsequent data flow.

Subsequently, after receiving a Termination of SDF event from the UP 1, the CP triggers to release the PDU session between the UE and the UP 1.

Figure 8:
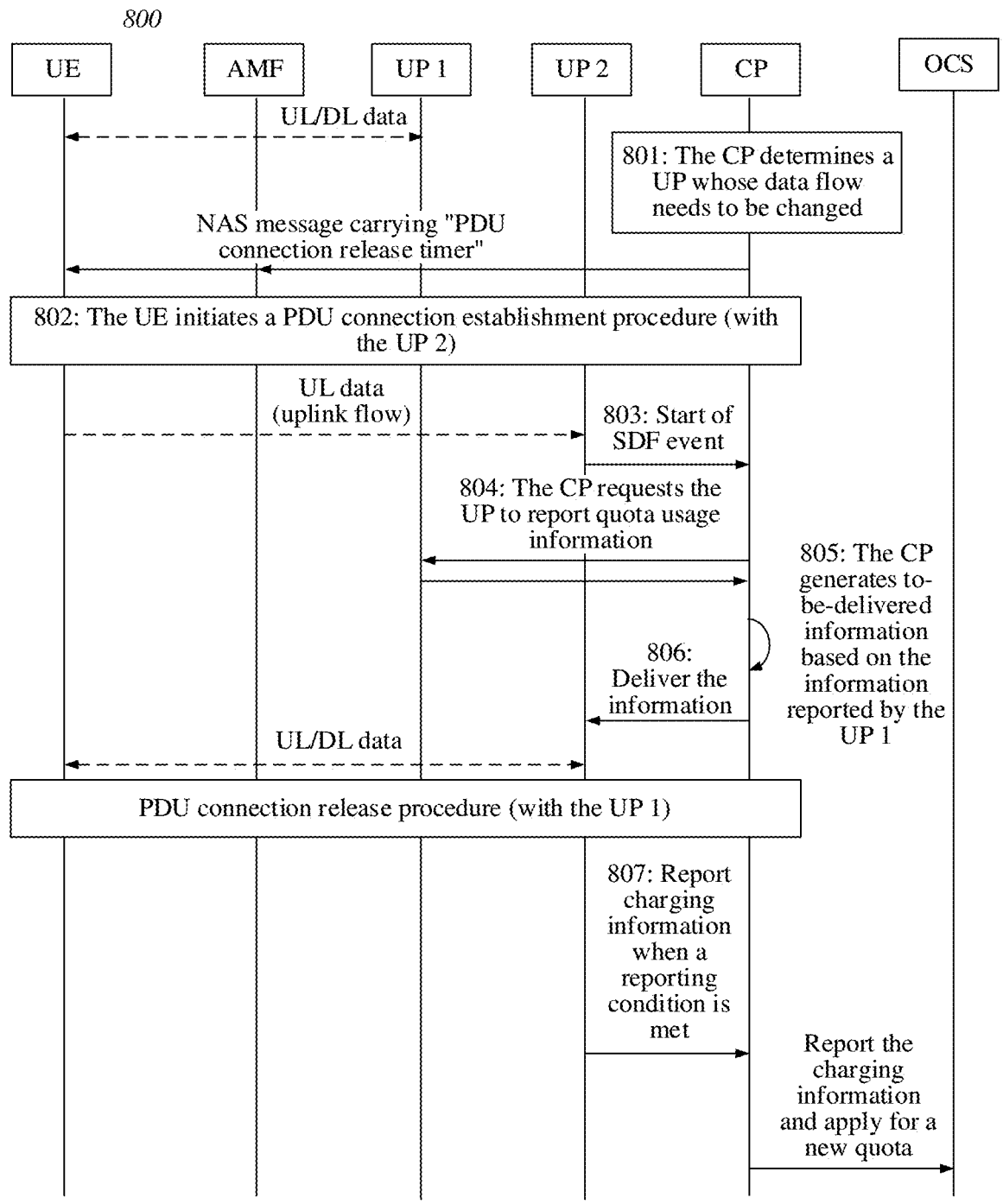
FIG. 8 is an illustrative flowchart of a charging method 800o according to an embodiment of this application.

B12: A charging processing method provided when the OCS does not sense migration of a data flow between the UPs is shown in FIG. 8. Specific steps are described as follows:

Step 801: The CP determines a UP whose data flow needs to be changed (a UP performing charging collection changes).

Step 802: The CP initiates to establish a PDU session on the UP 2.

Specifically, the CP initiates a PDU session establishment procedure of the UP 2.

Step 803: After the establishment of the PDU session on the UP 2 succeeds, the UE migrates an uplink data flow sent by the UE to the PDU session on the UP 2. When receiving the uplink flow, the UP 2 triggers a Start of SDF event and reports the Start of SDF event to the CP.

Step 804: After receiving the Start of SDF event reported by the UP 2, the CP sends, to the UP 1, a message for requesting to report charging information, and receives the charging information reported by the UP 1.

The reported information of the UP 1 includes a reporting reason (that is, a condition for triggering the reporting). The reporting reason herein is PDU Session Release.

Step 805: The CP determines a remaining available quota based on the charging information of the data flow that is reported by the UP 1, generates, based on the remaining available quota, information to be delivered to the UP 2. The information to be delivered to the UP 2 carries corresponding information of the remaining available quota.

A method for determining, by the CP, the remaining quota based on the charging information reported by the UP 1 is one of the following.

a. If the CP caches quota information when delivering the quota to the UP 1, the UP 1 reports usage information of the quota, and the CP deducts the usage information of the quota reported by the UP 1 from the cached quota information, to obtain the remaining available quota.

Example of a Format of the Reported Information

ID corresponding to a quota
Reporting reason (Reporting Trigger)
Charging information: {Usage information} b. If the CP does not cache the quota information when delivering the quota to the UP 1, the UP 1 reports both the usage information of the quota and a remaining quota value, and the CP uses the received remaining quota value reported by the UP 1 as the remaining available quota.

After obtaining the remaining available quota, the CP further determines whether a condition for reporting to the OCS is met. The determining is performed based on a trigger condition delivered by the OCS. For example, if the remaining quota is just lower than a threshold specified by the OCS, the condition for reporting to the OCS is met. If the condition is met, information to be reported to the OCS is generated based on the reporting performed by the UP 1, and the CP normally reports the generated information to be reported to the OCS to the OCS, and requests a new quota. A reporting reason indicates the trigger condition that is met. If the condition for reporting to the OCS is not met, information to be delivered to the UP 2 is generated based on the remaining available quota. The generated information to be delivered to the UP2 carries corresponding information of the remaining available quota.

Step 806: The CP delivers the generated information to the UP 2, where the information to be delivered to the UP2 carries the remaining available quota, so that the UP 2 uses the remaining available quota for a subsequent data flow.

The CP processes, by using any of the following methods, the charging information reported by the UP 1:

The CP caches the usage information reported by the UP 1.

The CP delivers the information reported by the UP 1 to the UP 2, and the UP 2 continually counts based on the reported information.

Step 807: The CP receives usage information reported by the UP 2 when a reporting condition is met, generates, based on the usage information reported by the UP 1 and the usage information reported by the UP 2, information to be reported to the OCS, and reports the generated information to the OCS.

Specifically, if the CP caches the charging information reported by the UP 1, the CP merges the usage information reported by the UP 2 and the cached usage information reported by the UP 1 to generate the charging information to be reported to the OCS, and reports the charging information to the OCS. If the CP previously also delivers the information reported by the UP 1 to the UP 2, the UP 2 continually accumulates based on the usage information reported by the UP 1 and performs merging and reporting. The CP generates, based on the charging information reported by the UP 2, the charging information to be reported to the OCS, and reports the charging information to the OCS.

In the solutions of the embodiments B11 and B12 of the present invention, the CP uses the Start of SDF event reported by the UP 2 as a flag indicating successful establishment of the PDU session on the UP 2 and start of data transmission, to trigger to send to the UP 1, a message for requesting to report the charging information, thereby implementing charging when a PDU session corresponds to a plurality of UPs, and a data flow corresponding to a same charging key does not cross the UPs. In the solutions of B11 and B12, the processing manners in which the OCS senses and does not sense migration are further distinguished, so that charging processing is more flexible.

B13: The CP determines to use the method in B11 or B12 as indicated by the OCS.

When delivering the quota to the CP, based on a decision of the OCS, the OCS may deliver, together with the quota, a trigger condition indicating a change of the UP; or may not deliver the trigger condition. The trigger condition indicates the CP to initiate re-authorization to the OCS when the UP using the quota changes. Specific steps are described as follows:

Step 1: The CP determines a UP whose data flow needs to be changed (a UP performing charging changes).

Step 2: The CP initiates to establish a PDU session on the UP 2.

Step 3: The UE migrates an uplink data flow sent by the UE to the PDU session on the UP 2. When receiving the uplink flow from the UE, the UP 2 triggers a Start of SDF event and reports the event to the CP.

Step 4: After receiving the Start of SDF event reported by the UP 2, the CP sends to the UP 1, a message for requesting to report charging information, and receives the charging information reported by the UP 1. The reported information of the UP 1 includes a reporting reason (that is, a condition for triggering the reporting), and the reporting reason herein is PDU Session Release.

Step 5: If the OCS delivers, for the quota, a trigger condition indicating a change of the UP, the reporting performed by the UP 1 makes the trigger condition be met, so that the CP performs steps 705 to 707 of B11; or if the OCS does not deliver, for the quota, a trigger condition indicating a change of the UP, the CP performs steps 805 to 807 of B12.

In the solution of the embodiment B13 of the present invention, when delivering the quota to the CP, the OCS delivers, based on a decision of the OCS or an operator configuration, the trigger condition indicating the change of the UP together with the quota. So that charging flexibility can be enhanced and autonomy of the OCS can be improved by. The OCS instructs the CP to report the migration of the data flow between the UPs when different charge rates need to be used and executed for service data flows on the different UPs to support more flexible and proper charging. And the OCS instructs the CP not to report the migration of the data flow between the UPs to reduce signaling, when the OCS does not need to perform charging processing based on the UPs.

B2: After the PDU session on the UP 2 is established, if a service data flow on the UP 1 is migrated to the UP 2, and a service data flow corresponding to a charging key crosses the UPs, in other words, within a period of time (usually, after the UP 2 sends the Start of SDF event and before the UP 1 sends the Termination of SDF event), a service data flow corresponding to a same charging key exists on both the UP 1 and UP 2 at the same time, as illustrated in Table 3:

TABLE 3

| Before the migration | | | After the migration | | | |
|---|---|---|---|---|---|---|
| UP 1 | | | UP 1 | UP 2 | | |
| CK 1 | CK 2 | | CK 1 | CK 1 | CK 2 | |
| SF 1 | SF 2 | SF 3 | SF 1 | SF 1 | SF 2 | SF 3 |

The CP may determine, after the migration, whether a data flow of a charging key crosses the UPs; or control, by using a routing table when a routing policy is generated, whether a data flow of a charging key crosses the UPs. A specific method may be as follows: The CP determines, based on routing tables generated by the CP for the UP 1 and the UP 2 and a flow template corresponding to a charging key delivered by the PCF, whether content covered by the flow template corresponding to the charging key is distributed to the routing tables of the UP 1 and the UP 2, to determine whether a data flow corresponding to the charging key crosses the UPs. In the example of Table 3, the data flow SF 1 corresponding to the CK 1 crosses the UPs. A specific processing method for charging is as follows:

B21: The CP manages a quota, including controlling usage of the quota and reporting of the quota.

For a manner of using a service-based protocol interface (for example, Restful), the CP and the OCS may directly interact with each other by using a service-based message.

Figure 9:
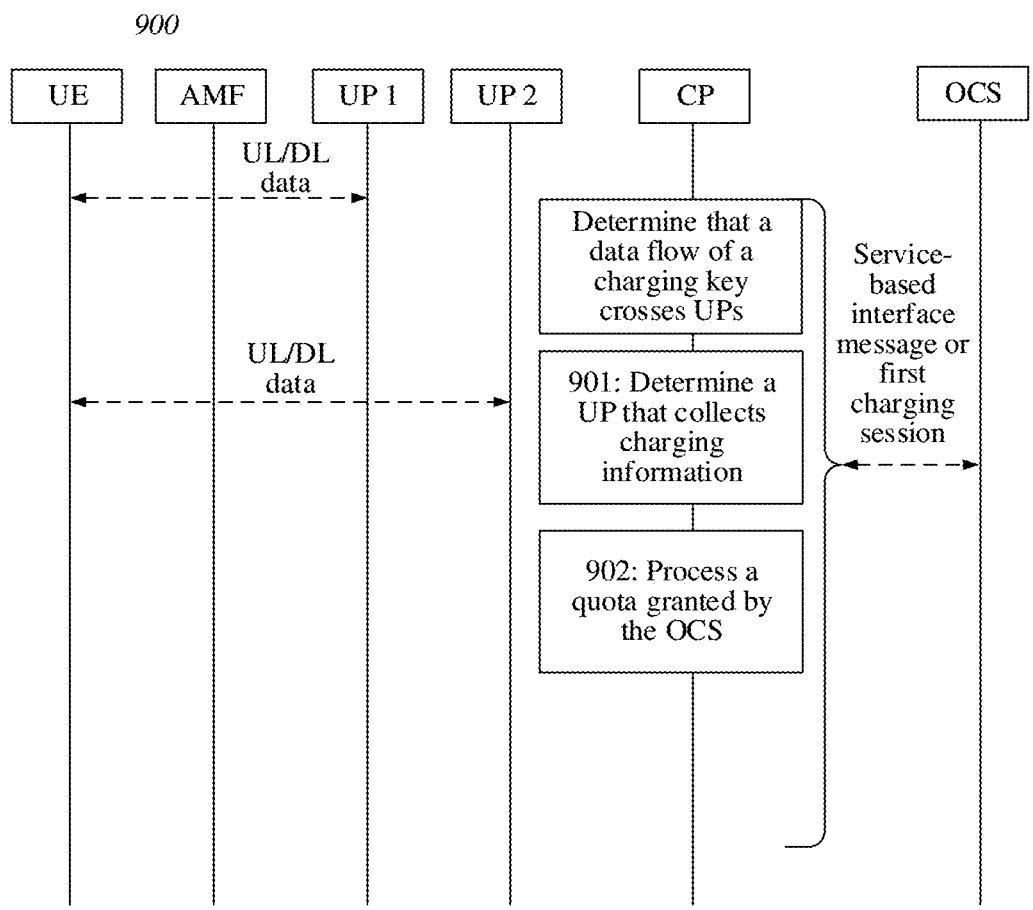
FIG. 9 is an illustrative flowchart of a charging method 900 according to an embodiment of this application.
Figure 10:
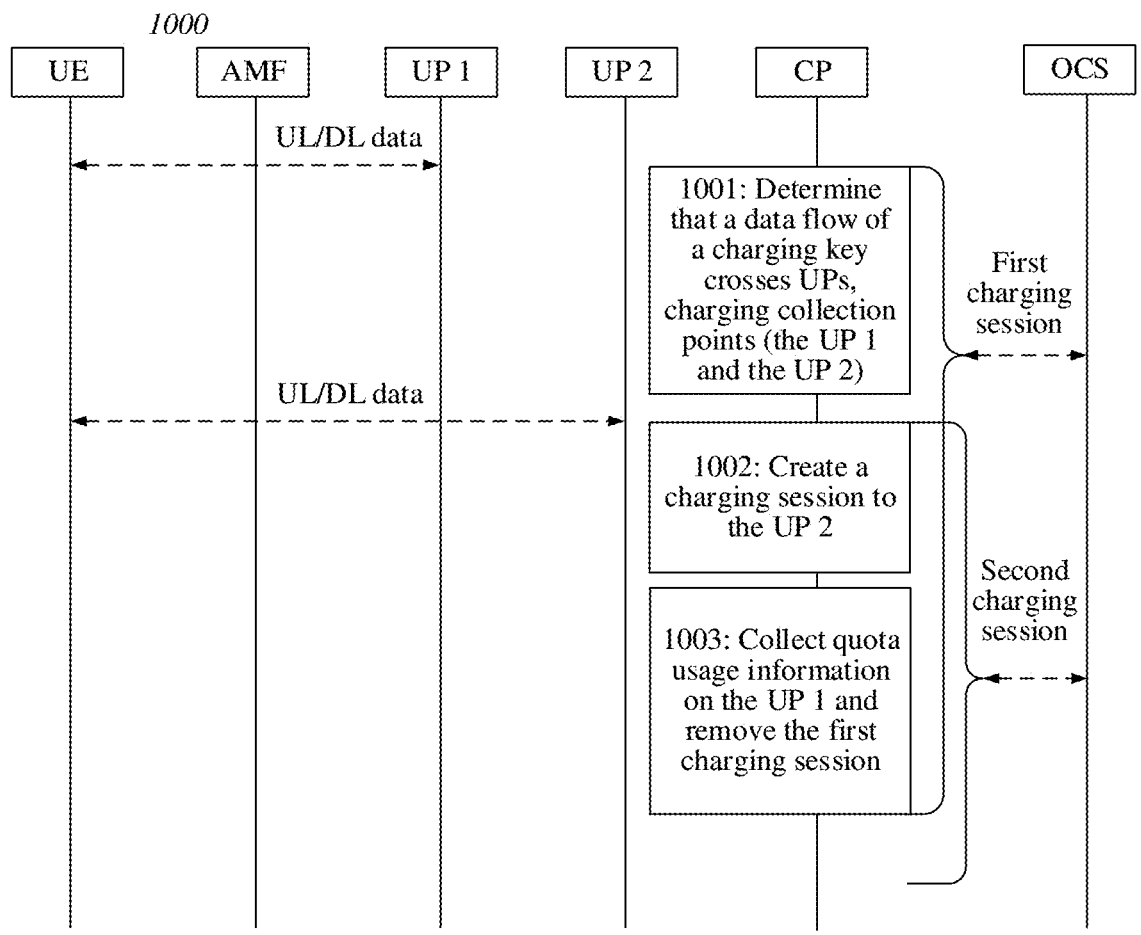
FIG. 10 is an illustrative flowchart of a charging method 1000 according to an embodiment of this application.

For a Diameter protocol interface, one charging session is used for one PDU session. In other words, no new charging session is added because of migration of a data flow. Referring to FIG. 9, it should be noted that in the following steps, parts not related to the interaction between the CP and the OCS are also applicable to the manner of using the service-based protocol interface. Specific steps are described as follows.

Step 901: The CP determines a UP that collects charging information.

Because a service data flow corresponding to a same charging key exists on both the UP 1 and the UP 2 when a data flow is migrated, the CP needs to determine the UP that collects the charging information. Specifically, the CP determines, based on a policy sent and activated by the PCF, the UP that collects the charging information. The UP 1 and the UP 2 herein are charging collection points determined by the CP. A moment at which the CP determines the UP that collects the charging information and a moment at which the CP determines that the data flow corresponding to the CK crosses the UPs do not have a strict time sequence relationship.

Step 902: The CP processes a quota granted by the OCS.

The quota granted by the OCS herein includes: a quota newly granted by the OCS (the CP applies to the OCS for the quota based on the charging key) or an available quota that is not used on the UP 1 and that is obtained by the CP.

Because a plurality of UPs are logically independent, the CP needs to separately control a quota for each UP, including: delivering of the quota and reporting of usage information. Because policies that are delivered by the PCF for different UPs use a same charging key, and the OCS allocates the quota based on the charging key, the quota that is received by the CP and that is allocated by the OCS may be a cross-UP quota. To prevent the quota allocated by the OCS from crossing the UPs or ensure normal use of a cross-UP quota, a specific method is as follows.

Step 9021: The CP requests the OCS for a quota of a charging key regardless of whether the charging key crosses the UPs.

Step 9022: After receiving the quota allocated by the OCS and when generating a rule to be delivered to the UP, the CP determines whether the quota is shared by a plurality of UPs. Specifically, the CP may determine, based on whether data flows corresponding to the charging key corresponding to the quota are distributed on different UPs, whether the quota is shared by the plurality of UPs. If the data flows corresponding to the charging key are distributed on the plurality of UPs, the quota is shared by the plurality of UPs.

Step 9023: If the CP detects that one quota crosses the UPs, the CP divides the quota into small quotas, allocates a small quota for each UP, then generates, by using the small quotas, a rule to be delivered to the UP, and delivers the rule to the UP for execution. The CP records a correspondence between these small quotas obtained through division and the UPs.

Step 9024: The CP receives charging data that is reported by any UP (for example, the UP 1) when the quota is used up or when a reporting condition is met, the CP sends, to other UPs based on the stored correspondence between the small quotas and the UPs, a request for requesting to report usage information of the quota, and the CP may perform the following processing after receiving usage information of the quota that is returned by all the UPs:

The CP merges the usage information of the quota that is reported by all the UPs into a message and reports the message to the OCS. Usage information of each UP in the message is used as an independent container. A container corresponding to the information reported by the UP 1 includes a trigger that is met and a corresponding UP identifier. A container corresponding to information reported by another UP includes information indicating that the reporting is caused by other reporting. Specifically, a related trigger may be carried in the container, or a value of a reporting reason indicates related reporting, and a corresponding UP identifier is carried.

Example of a Reporting Format:
CCA message
Rating-Group Corresponding to a charging key
Used-Service-Unit Corresponding to the UP 1
Reporting-Reason (indicating a reporting reason: met trigger)
Tariff-Time-Change
CC-Time
CC-Total-Octets
CC-Input-Octets
CC-Output-Octets
Used-Service-Unit Corresponding to the UP 2
Reporting-Reason (indicating a reporting reason: related reporting)
Tariff-Time-Change
CC-Time
CC-Total-Octets
CC-Input-Octets
CC-Output-Octets Alternatively, the usage information reported by all the UPs is merged, and a container is used to report merged usage information. If Tariff-Time-Change exists, during merging, parts before Tariff-Time-Change in reported information of each UP are merged, and parts after Tariff-Time-Change in the reported information of each UP are merged.

The reported message may further carry a reporting reason, and the reason is: reporting caused by a UP.

Example of a message:
CCA message
Rating-Group Corresponding to a charging key
Used-Service-Unit Merged usage information of the UP 1 and the UP 2
Reporting-Reason (indicating a reporting reason: reporting caused by a UP)
Tariff-Time-Change
CC-Time
CC-Total-Octets
CC-Input-Octets
CC-Output-Octets The CP caches the usage information reported by the UPs (the information is reported to the OCS when reporting to the OCS is performed next time), summarizes unused remaining available quotas, then re-divides the unused remaining available quotas into small quotas (a small quota is allocated to each UP), and delivers the small quotas to the UPs for further use.

One of (a) and (b) may be selected for implementation.

Alternatively, (a) and (b) may both be implemented. If (a) and (b) are both implemented, the CP needs to perform further determining: If a condition for reporting to the OCS (the reporting condition may be a re-authorization trigger condition delivered by the OCS or a usage limitation condition of the quota, for example, the quota expires) is met, (a) is performed; otherwise, (b) is performed.

In the solution of the embodiment B21 of the present invention, the CP controls use of the quota on the plurality of UPs, to coordinate sharing of the quota between the plurality of UPs and shield impact of quota use complexity on the OCS, thereby improving efficiency of the OCS.

B22: For a case in which when the CP interacts with the charging system by using the Diameter protocol, the CP establishes a new online charging session for the UP 2, refer to FIG. 10.

Step 1001: The CP determines a UP that collects charging information.

If there are a plurality of UPs, the CP needs to determine the UP that collects the charging information. Specifically, the CP receives a policy activated by the PCF and determines, based on the policy, the UP that collects the charging information. The UP 1 and the UP 2 therein are charging information collection points.

Step 1002: The CP determines that a service data flow corresponding to a charging key of the PDU session crosses the UPs, and the CP initiates to the OCS to establish a new UP 2 -dedicated online charging session for a UP that is created and that needs to perform online charging counting. The figure is only an example. It should be noted that a moment at which the CP determines the UP that collects the charging information and a moment at which the CP determines that the data flow corresponding to the CK crosses the UPs do not have a strict time sequence relationship.

Specifically, the CP determines a current SSC mode. If the SSC mode is an SSC mode 3, it is presumed that a service data flow corresponding to a particular charging key may cross the UPs, establishment of a new charging session is initiated for the UP 2.

Alternatively, if the SSC mode is the SSC mode 3, based on allocated routing information, there is a service data flow corresponding to a particular charging key that crosses the UP 1 and the UP 2, and establishment of a new charging session is initiated for the UP 2.

If the CP adds a BP or UL CL for the PDU session, after the UP that needs to perform online charging counting is determined, the foregoing determining is also performed. If there is a service data flow corresponding to a particular charging key that crosses the UP 1 and the UP 2, establishment of a new charging session is initiated for the UP 2 or the BP or UL CL that is to perform an online charging function.

The CP stores a correspondence between the UP and the charging session.

In this case, the CP separately applies for a quota, manages quota usage, and reports quota usage information for the UP 2 in the new charging session.

Step B1003: When the PDU session on the UP 1 is removed or when there is no data flow on the UP 1, the CP determines to initiate to the OCS to remove a charging session corresponding to the UP 1.

When or before the charging session corresponding to the UP 1 is removed, the quota usage information collected on the UP 1 is reported to the OCS.

Figure 11:
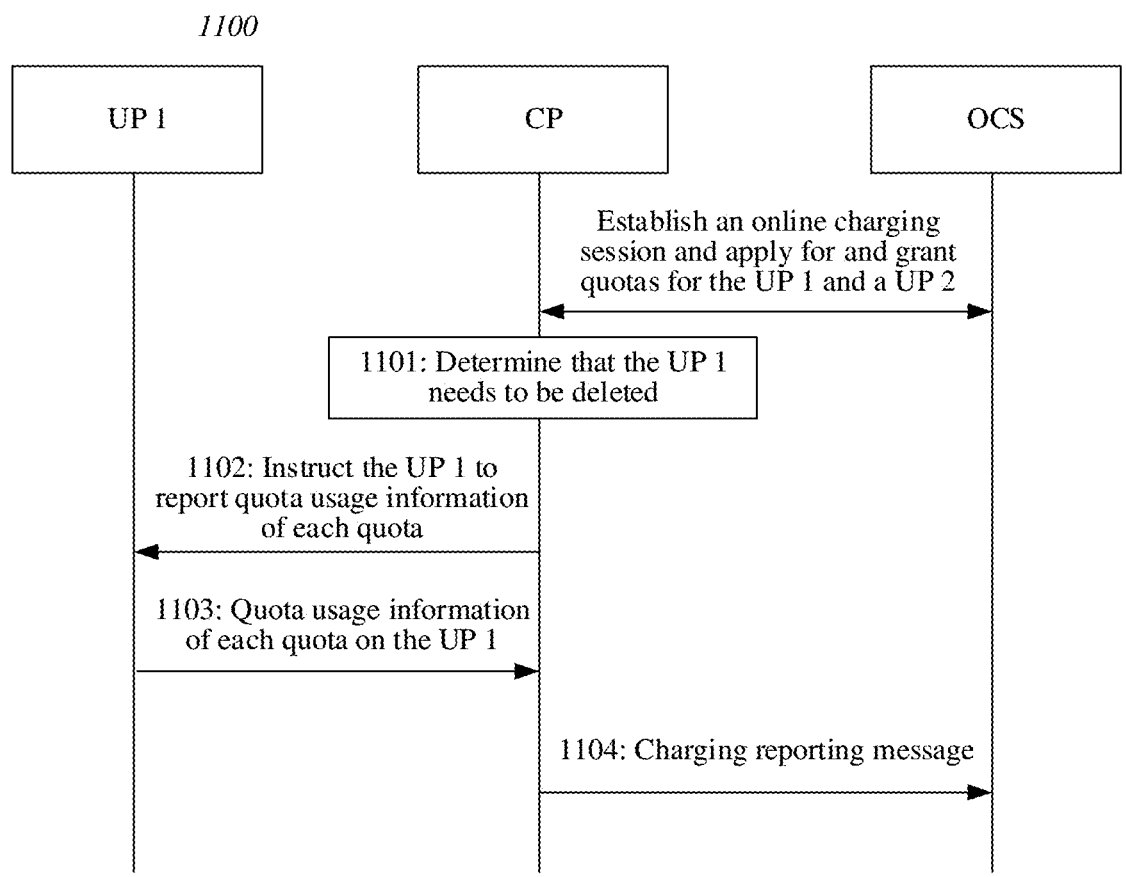
FIG. 11 is an illustrative flowchart of a charging method 1100 according to an embodiment of this application.

Further, if the CP deletes a PDU session on a particular UP, steps are shown in FIG. 11 and are as follows:

Step 1101: The CP determines to delete a PDU session on the UP 1.

Step 1102: The CP delivers information to the UP 1 and deletes the PDU session.

Step 1103: The CP receives charging information reported by the UP 1.

Step 1104: The CP initiates, based on the stored correspondence between the UP 1 and a charging session corresponding to the UP 1, an end request of the charging session to the OCS. The end request carries the usage information reported by the UP 1.

Online charging sessions of other UPs are not affected by end of the PDU session on the UP 1 and are not affected by end of the online charging session corresponding to the UP 1.

In the solution of the embodiment B22 of the present invention, the CP establishes an independent charging session for each UP, thereby lowering implementation complexity of the CP and the OCS, and the CP does not need to coordinate usage of a quota between a plurality of UPs.

Solution C: An embodiment of the present invention further provides a charging method. The method describes interaction between a CP, two UPs corresponding to the CP, and a charging system from a static perspective, and completes collection and reporting of charging information and a process of quota application and delivery.

The method includes: obtaining, by a control plane function entity CP from a first user plane function entity UP and a second UP, charging information of a data flow on a PDU session corresponding to the CP, where the first UP and the second UP are UPs corresponding to the CP; and dividing, by the CP, a quota that is delivered by a charging system into a plurality of sub-quotas and delivering the plurality of sub-quotas to the first UP and the second UP.

Usually, data flow using a same charging key exists on the first UP and the second UP. The CP obtains charging information of the data flow from both the first UP and the second UP. In a case of using a Diameter protocol interface, the CP charges the first UP and the second UP through a charging session between the CP and the charging system.

The dividing, by the CP, a quota that is delivered by a charging system into a plurality of sub-quotas and delivering the plurality of sub-quotas to the UPs includes: dividing, by the CP, a quota that is delivered by the charging system for the charging key into a plurality of sub-quotas and separately delivering the plurality of sub-quotas to the first UP and the second UP.

The method further includes: after a sub-quota on any UP is used up and charging information corresponding to the sub-quota is reported, obtaining, by the CP, charging information corresponding to the sub-quotas that is counted by other UPs; and merging, by the CP, the charging information corresponding to the sub-quotas, and reporting the charging information to the charging system.

The method further includes: after a sub-quota on any UP is used up and charging information corresponding to the quota is reported, obtaining, by the CP, charging information corresponding to the sub-quotas that is counted by other UPs; and caching, by the CP, charging information corresponding to quotas that is reported by all UPs, determining remaining available amounts of the sub-quotas, re-allocating the remaining available amounts of the sub-quotas, and delivering re-allocated the remaining available amounts of the sub-quotas to the first UP and the second UP; and when the quotas are used up or the remaining available amounts of the sub-quotas meet a reporting threshold, merging, by the CP, the cached charging information corresponding to the quotas, and reporting merged charging information to the charging system.

It should be noted that for the solution C, reference may be made to related content of steps in the foregoing embodiments A and B, especially, a case of the embodiment B21, based on correlation thereof, and details are not described herein again. According to the technical solutions described in this embodiment, the CP may charge data flows generated on two UPs corresponding to the CP at the same time.

The charging system includes an online charging system OCS and an online charging system OFCS. Offline charging relates only to charging information collection and reporting (including a reporting trigger condition), and online charging further includes quota granting, quota usage management (including monitoring a quota usage condition), a dynamic trigger (a trigger condition activated by the OCS), and quota usage information reporting in addition to charging information collection and reporting similar to that in offline charging. Unless specially described in this application, charging reporting is applicable to reporting in online charging and reporting in offline charging, but charging quota application, quota usage management, and a dynamic trigger are applicable only to online charging. There are several methods for offline charging, including: A CTF reports charging information in real time; the CTF reports a CDR after generating the CDR; and the CTF directly reports a CDR file after generating the CDR file. Collection granularities of the charging information, trigger conditions for triggering reporting or writing the CDR in real time, and the like are all the same in the several manners. Therefore, this embodiment of this application is described only by using an example in which the CTF reports the charging information in real time.

For the case A in the foregoing embodiments, that is, the CP first removes a connection between the UE and the UP 1 and then establishes a connection between the UE and the UP 2, an offline charging method is briefly described as follows. For related details, refer to the foregoing embodiments. Details are not described herein again.

Step 1: The CP determines a UP whose data flow needs to be changed (a UP performing charging changes), and the CP terminates a PDU session between the UE and the UP 1 and establishes a PDU session between the UE and the UP 2.

Step 2: The CP initiates to terminates the PDU session on the UP 1 and receives charging information reported by the UP 1.

A PDU session terminates procedure on the UP 1 triggers the UP 1 to report the charging information to the CP. The reported information of the UP 1 includes a reporting reason (that is, a condition for triggering the reporting). The reporting reason herein is PDU Session Release.

Step 3 (the charging system senses switching between the UPs): The CP reports the charging information to a CDF/CGF/BS, where a reporting reason is "UP changed".

Step 3' (the charging system does not sense switching between the UPs): The CP caches usage information reported by the UP 1 and waits for the UP 2 to report usage information, and after receiving the usage information reported by the UP 2, the CP merges the usage information reported by the UP 2 and the cached usage information reported by the UP 1 and reports merged information to the CDF/CGF/BS.

For the case B, that is, the CP establishes a connection between the UE and the UP 2 but does not remove a connection between the UE and the UP 1, an offline charging method is briefly described as follows.

Step 1: The CP determines a UP whose data flow needs to be changed (a UP performing charging changes), and the CP first establishes a PDU session between the UE and the UP 2, and terminates a PDU session between the UE and the UP 1 after the data flow is handed over to the UP 2.

Step 2: The CP initiates to establish a PDU session on the UP 2.

Step 3: The UE migrates an uplink data flow sent by the UE to the PDU session on the UP 2. When receiving the uplink flow, the UP 2 triggers a Start of SDF event and reports the event to the CP.

Step 4: After receiving the Start of SDF event reported by the UP 2, the CP sends a message for requesting to report charging information to the UP 1, and receives the charging information reported by the UP 1.

The reported information of the UP 1 includes a reporting reason (that is, a condition for triggering the reporting). The reporting reason herein is PDU Session Release.

Step 5 (the charging system senses switching between the UPs): The CP reports the charging information to a CDF/CGF/BS, where a reporting reason is "UP changed".

Step 5' (the charging system does not sense switching between the UPs): The CP caches usage information reported by the UP 1 and waits for the UP 2 to report usage information, and after receiving the usage information reported by the UP 2, the CP merges the usage information reported by the UP 2 and the cached usage information reported by the UP 1 and reports merged information to the CDF/CGF/BS.

In the offline solution of this embodiment of the present invention, in a relatively complex scenario in which a control plane and a user plane are separated, for example, when a user plane of a PDU session switches or when a PDU session has a plurality of user planes, a service data flow of a user is charged in a case of migration between user planes, so that offline charging can support a lower end-to-end delay of a service, and network efficiency is improved by using optimal deployment, thereby accurately charging a data service in the optimal deployment and improving network efficiency and user experience.

The foregoing mainly describes the solutions provided in the embodiments of this application from a perspective of interaction between network elements. It can be understood that to implement the foregoing functions, the CP, UP, or OCS/OFCS includes hardware structures and/or software modules for performing the functions. A person of ordinary skill in the art should easily be aware that, with reference to the examples of units and algorithm steps that are described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, functional modules of the CP and OCS/OFCS may be divided based on the foregoing method examples. For example, functional modules may be divided based on functions, or two or more functions may be integrated into one processing module. The integrated module may be implemented in a form of hardware, or may be implemented in a form of a software functional module. It should be noted that, in this embodiment of this application, the module division is an example, and is merely logical function division. In actual implementation, another division manner may be used.

Figure 12:
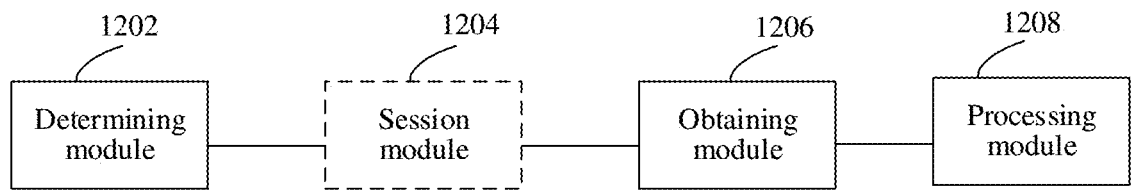
FIG. 12 is a possible schematic structural diagram of a charging device 1200 according to an embodiment of this application.

For example, when the corresponding functions are used to divide the functional modules, FIG. 12 is a possible schematic structural diagram of the CP in the foregoing embodiments used as a charging device 1200.

The charging device 1200 includes a determining module 1202, an obtaining module 1206, and a processing module 1208. The determining module 1202 is configured to determine that a data flow that is transmitted by user equipment UE on a first data session needs to be migrated to a second data session, where the first data session is a data session between the UE and a first user plane function entity UP, the second data session is a data session between the UE and a second UP, the first UP and the second UP are UPs corresponding to the charging device, and the first data session and the second data session correspond to a same PDU session. The obtaining module 1206 is configured to obtain charging information of the data flow before the migration that is counted by the first UP. The processing module 1208 is configured to: determine a quota that is used for the data flow after the migration is necessary to be delivered to the second UP, and deliver the quota to the second UP.

A charging information reporting interface may be a Diameter protocol interface or a service-based interface. In a manner of using a service-based interface, no charging session is established between the CP and a charging system, but the CP and the charging system directly interact with each other by using a service-based message. The service-based message (for example, Restful) is a stateless message. Each message carries complete information. In a case of using the Diameter protocol interface, a charging session needs to be established between the CP and the charging system.

Optionally, the charging device further includes a session module 1204, configured to: establish a first charging session to the charging system and charge the data flow on the first UP by using the first charging session, where the determining module 1202 is further configured to determine that no other data flow using a charging key that corresponds to the data flow exists on the first UP after the data flow is migrated from the first UP to the second UP, and the session module 1204 is further configured to charge the data flow on the second UP by using the first charging session.

Optionally, the obtaining module 1206 is configured to: receive charging information of the data flow before the migration that is reported by the first UP, report the charging information to the charging system by using the session module 1204, and request a quota for the data flow for the second UP; the session module 1204 is configured to receive a quota delivered by the charging system; and the processing module 1208 is configured to generate, based on the quota delivered by the charging system, the quota to be delivered to the second UP.

Optionally, the processing module 1208 is configured to: determine a remaining available quota based on the obtained charging information of the data flow before the migration that is counted by the first UP, and generate, based on the remaining available quota, the quota to be delivered to the second UP.

Optionally, the obtaining module 1206 is configured to receive charging information that is reported by the first UP by using triggering of interruption of the first data session.

Optionally, the obtaining module 1206 is configured to: after a data flow start event corresponding to the data flow that is reported by the second UP is detected, obtain the charging information of the data flow before the migration that is counted by the first UP.

Optionally, the determining module 1202 is configured to determine that another data flow using a charging key that corresponds to the data flow exists on the first UP after the data flow is migrated from the first UP to the second UP; and the obtaining module 1206 is further configured to obtain the charging information of the data flow from both the first UP and the second UP.

Optionally, the determining module 1202 is further configured to determine that another data flow using a charging key that corresponds to the data flow exists on the first UP after the data flow is migrated from the first UP to the second UP; the session module 1204 is further configured to: establish a second charging session with the charging system for the second data session on which the data flow on the second UP is transmitted, and request the charging system for a quota for the second UP by using the second charging session; and the processing module 1208 is further configured to deliver the applied quota to the second UP.

It should be noted that for the functional descriptions of the corresponding functional modules, reference may be made to all related content of the steps in the foregoing method embodiments. Details are not described herein again.

Figure 13:
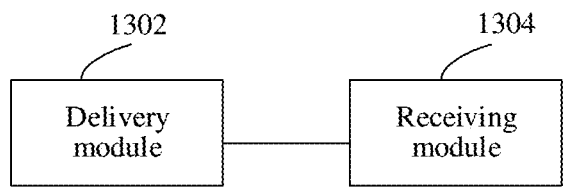
FIG. 13 is a possible schematic structural diagram of a charging system 1300 according to an embodiment of this application.

When functional modules are divided in an integrated manner, FIG. 13 is a possible schematic structural diagram of a charging system 1300 in the foregoing embodiments. The charging system 1300 includes a delivery module 1302 and a receiving module 1304.

The delivery module 1302 is configured to deliver indication information to a control plane function entity (CP), where the indication information is used to: after a user plane function entity (UP) corresponding to the CP switches from a first UP to a second UP, instruct the CP to report charging information of the first UP before the switching to the OCS; and the receiving module 1304 is configured to receive the charging information before the switching that is reported by the CP and that is counted by the first UP.

Optionally, the charging system is an online charging system (OCS), and the indication information is delivered together with a quota delivered by the OCS to the CP.

Optionally, the OCS delivers a new quota to the CP after receiving the charging information reported by the CP.

Optionally, after receiving the charging information reported by the CP, the OCS delivers a quota for the second UP to the CP or delivers both a quota for the first UP and a quota for the second UP to the CP.

It should be noted that for the functional descriptions of the corresponding functional modules, reference may be made to all related content of the steps performed by the charging system in the foregoing method embodiments. Details are not described herein again.

The "module" in the embodiments of FIG. 12 and FIG. 13 may be an application-specific integrated circuit (ASIC), an electronic circuit, a processor for executing one or more software or firmware programs and a memory, an integrated logic circuit, or another component providing the foregoing functions. Optionally, the charging device and the charging system are implemented in a form of a computer device. The receiving module and the sending module may be implemented by using a processor, a memory, and a communications interface of the computer device. The processing module may be implemented by using the processor and the memory of the computer device.

It should be noted that although only the processor 302, the memory 304, the communications interface 306, and the bus 308 are shown in the computer device 300 in FIG. 3, in a specific implementation process, a person skilled in the art should understand that the charging device and the charging system further include other devices required for implementing normal running. In addition, according to a specific requirement, a person skilled in the art should understand that the charging device and the charging system may further include a hardware device for implementing another additional function. In addition, a person skilled in the art should understand that the charging device and the charging system may alternatively include only devices required for implementing the embodiments of this application, and do not necessarily include all devices shown in FIG. 3.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of this application. The storage medium includes any medium that can store program code, for example, a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining, by a control plane function entity (CP), that a data flow being transmitted by user equipment (UE) on a first data session needs to be migrated to a second data session, wherein the first data session is between the UE and a first user plane function entity (UP) and is controlled by the CP, the second data session is between the UE and a second UP and is controlled by the CP, the first UP and the second UP are selected by the CP to transmit the data flow, and the first data session and the second data session correspond to a same protocol data unit (PDU) session;
   receiving, by the CP via an interface between the CP and the first UP, usage information for a first quota before the migration, wherein the first quota was requested by the CP from a charging system, and the usage information of the first quota before the migration is counted by the first UP and reported to the CP by the first UP;
   determining, by the CP based on the first quota and the usage information of the first quota, a second quota for the data flow after the migration, wherein the second quota is based on a remaining available quota of the first quota; and
   delivering, by the CP via an interface between the CP and the second UP, for second quota for the data flow to the second UP;
   receiving, by the CP via the interface between the CP and the second UP, usage information for the second quota after the migration, wherein the usage information for the second quota after the migration is counted by the second UP and reported by the second UP; and
   reporting, by the CP based on the usage information counted by the first UP and the usage information counted by the second UP, total usage information to the charging system, and causing a user to be charged based on the total usage information.

2. The method according to claim 1, further comprising:
   determining, by the CP, that no other data flow using a charging key that corresponds to the data flow exists on the first UP after the data flow is migrated to the second data session; and
   charging, by the CP, the data flow on the second data session using a first charging session between the CP and the charging system, wherein the first charging session is used to charge the data flow on the first data session before the data flow is migrated to the second UP.

3. The method according to claim 1, further comprising:
   caching, by the CP, the usage information for the first quota before the migration.

4. The method according to claim 1, further comprising:
   determining, by the CP according to an indication delivered by the charging system, to report the usage information for the first quota before the migration to the charging system after the data flow is migrated from the first data session to the second data session.

5. The method according to claim 1, wherein the reporting by the first UP of the usage information for the first quota before the migration is triggered by an interruption of the first data session.

6. The method according to claim 1, wherein receiving, by the CP, the usage information for the first quota before the migration comprises:
   requesting, by the CP after detecting a data flow start event corresponding to the data flow, the first UP to report the usage information for the first quota before the migration, wherein the data flow start event is reported by the second UP.

7. The method according to claim 1, further comprising:
   determining, by the CP, that another data flow using a charging key that corresponds to the data flow exists on the first UP after the data flow is migrated from the first data session to the second data session;
   charging, by the CP, the data flow on the second data session using a first charging session between the CP and the charging system; and
   charging, by the CP, the another data flow on the first data session using the first charging session between the CP and the charging system.

8. The method according to claim 1, further comprising:
   charging, by the CP, the data flow on the first data session using a first charging session between the CP and the charging system;
   determining, by the CP, that another data flow using a charging key that corresponds to the data flow exists on the first UP after the data flow is migrated from the first data session to the second data session;
   requesting the charging system for the second quota for the second data session; and
   delivering the second quota to the second UP, wherein a second charging session is established between the CP and the charging system for the second data session.

9. A computing device, comprising a processor, a non-transitory memory, a bus, and a communications interface, wherein the memory is configured to store a computing-device executable instruction, the processor is connected to the memory through the bus, and the processor is configured to execute the computing-device executable instruction stored in the memory, to cause the computing device to perform the method according to claim 1.

10. A method, comprises:
    determining, by a control plane function entity (CP), that a data flow being transmitted by user equipment (UE) on a first data session needs to be migrated to a second data session, wherein the first data session is between the UE and a first user plane function entity (UP) and is controlled by the CP, the second data session is between the UE and a second UP and is controlled by the CP, the first UP and the second UP are selected by the CP to transmit the data flow, and the first data session and the second data session correspond to a same protocol data unit (PDU) session;
    receiving, by the CP using an interface between the CP and the first UP, usage information for a first quota before the migration, wherein the first quota was requested by the CP from a charging system, and the usage information of the first quota before the migration is counted by the first UP and reported to the CP by the first UP;
    determining, by the CP based on the first quota and the usage information of the first quota, a second quota for the data flow after the migration, wherein the second quota is based on a remaining available quota of the first quota;
    delivering, by the CP using an interface between the CP and the second UP, the second quota for the data flow to the second UP;
    receiving, by the CP using the interface between the CP and the second UP, usage information for the second quota after the migration, wherein the usage information for the second quota after the migration is counted by the second UP and reported to the CP by the second UP;
    reporting, by the CP based on the usage information counted by the first UP and the usage information counted by the second UP, total usage information to the charging system; and
    receiving, by the charging system from the CP, the total usage information of the data flow, and charging a user based on the total usage information of the data flow.

* * * * *

UNITED STATES PATENT AND TRADEMARK OFFICE
CERTIFICATE OF CORRECTION

PATENT NO. : 10,674,330 B2
APPLICATION NO. : 16/586129
DATED : June 2, 2020
INVENTOR(S) : Xiaoqian Chai It is certified that error appears in the above-identified patent and that said Letters Patent is hereby corrected as shown below:

In the Claims

In Column 29, Line 66, Claim 1, delete "for second quota" and insert --the second quota--.

Signed and Sealed this
Twenty-second Day of September, 2020

Andrei Iancu
*Director of the United States Patent and Trademark Office*